(12) United States Patent
Hayashi

(10) Patent No.: US 6,424,479 B1
(45) Date of Patent: Jul. 23, 2002

(54) MAGNETIC DISK HAVING ADDRESS INFORMATION IN A FORM WHICH REPRESENTS GREY CODE BETWEEN NEIGHBORING RECORDING TRACKS AND A REPRODUCING APPARATUS THEREFOR

(75) Inventor: Nobuhiro Hayashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 08/588,020

(22) Filed: Jan. 17, 1996

(30) Foreign Application Priority Data

Jan. 20, 1995 (JP) ............................................. 7-007070
Feb. 16, 1995 (JP) ............................................. 7-028034

(51) Int. Cl.$^7$ ............................. G11B 5/09; G11B 5/596
(52) U.S. Cl. ............................. 360/49; 360/48; 360/51; 360/77.08
(58) Field of Search ............................. 360/48, 49, 51, 360/77.02, 77.11, 78.04, 78.14, 78.08

(56) References Cited

U.S. PATENT DOCUMENTS

| | | | |
|---|---|---|---|
| 4,032,984 A | 6/1977 | Kaser et al. | 360/77 |
| 4,530,019 A | 7/1985 | Penniman | 360/77 |
| 4,777,542 A | 10/1988 | Ozaki | 360/48 |
| 4,823,212 A | 4/1989 | Knowles et al. | 360/77.08 |
| 4,977,472 A | 12/1990 | Volz et al. | 360/78.14 |
| 5,047,880 A | 9/1991 | Ohno | 360/77.14 |
| 5,262,907 A | * 11/1993 | Duffy et al. | 360/77.05 |
| 5,270,878 A | * 12/1993 | Kaida et al. | 360/51 |
| 5,274,510 A | 12/1993 | Sugita et al. | 360/49 |
| 5,384,671 A | * 1/1995 | Fisher | 360/51 |
| 5,442,499 A | * 8/1995 | Emori | 360/48 |
| 5,585,989 A | * 12/1996 | Kuromiya et al. | 360/135 |

FOREIGN PATENT DOCUMENTS

| | | | |
|---|---|---|---|
| EP | 0269381 A2 | 6/1988 | G11B/5/596 |
| EP | 0295979 A1 | 12/1988 | G11B/5/596 |
| EP | 0335517 A2 | 10/1989 | G11B/27/30 |
| EP | 0353767 A2 | 2/1990 | G11B/5/55 |

* cited by examiner

*Primary Examiner*—Regina N. Holder
(74) *Attorney, Agent, or Firm*—Oblon, Spivak, McClelland, Maier & Neustadt, P.C.

(57) ABSTRACT

A magnetic recording medium and a data reproducing apparatus are provided in which, with the use of a required number of bits, the address information may be reliably reproduced even during the track-traversing seek operation without increasing redundancy to the track specifying address information. On a magnetic disk, there are recorded track addresses in which, with the bits magnetized in the running direction of the magnetic head being 1 and with the bit magnetized in the opposite direction being 0, the direction of magnetization represents a Grey code, and data "1" in the air gap of the track address. A servo detection circuit has a viterbi decoder for viterbi decoding the reproduced signals of the track addresses and the playback signal for the air gap for reproducing the track addresses. This assures reliable decoding of the track addresses without increasing redundancy to the number of bits of the amount of information as the track addresses while the properties of the Grey code are maintained.

20 Claims, 21 Drawing Sheets

MAGNETIZATION PATTERN

TRACK k+1

TRACK k

TRACK k-1

PLAYBACK SIGNAL

TRACK k+1

TRACK k+0.5

TRACK k

TRACK k-0.5

TRACK k-1

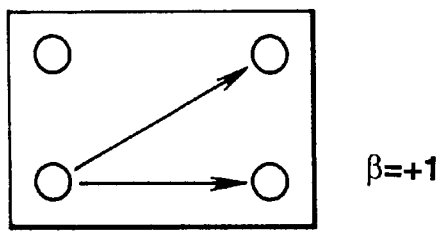
$y_k - y_p > 0$
$y_p \leftarrow y_k$
$\beta \leftarrow +1$
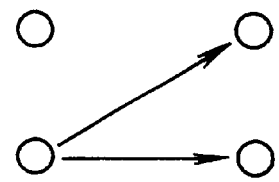
$-2 < y_k - y_p \leq 0$
$y_p \leftarrow y_p$
$\beta \leftarrow \beta$
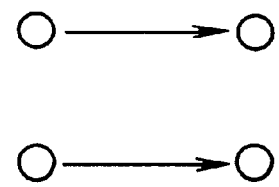
$y_k - y_p \leq -2$
$y_p \leftarrow y_k$
$\beta \leftarrow -1$
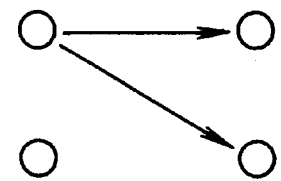
FIG.8

| FOR β=1 | | | |
|---|---|---|---|
| INPUT CONDITION | | | |
| CONDITION PATTERN | $y_k - y_p \leq -2$ <br> J1 | $-2 < y_k - y_p \leq 0$ <br> J2 | $0 < y_k - y_p$ <br> J3 |
| UPDATE RULE | $y_p \leftarrow y_k, \beta \leftarrow -1$ | $y_p \leftarrow y_k, \beta \leftarrow \beta$ | $y_p \leftarrow y_k, \beta \leftarrow +1$ |
| OUTPUT DATA | DATA β = -1 <br> MERGE SIGNAL = 1 <br> DATA α = 1 | DATA β = * <br> MERGE SIGNAL = 0 <br> DATA α = 0 | DATA β = 1 <br> MERGE SIGNAL = 1 <br> DATA α = 0 |

| FOR β=-1 | | | |
|---|---|---|---|
| INPUT CONDITION | | | |
| CONDITION PATTERN | $y_k - y_p < 0$ <br> J7 | $0 \leq y_k - y_p < +2$ <br> J8 | $+2 \leq y_k - y_p$ <br> J9 |
| UPDATE RULE | $y_p \leftarrow y_k, \beta \leftarrow -1$ | $y_p \leftarrow y_k, \beta \leftarrow \beta$ | $y_p \leftarrow y_k, \beta \leftarrow +1$ |
| OUTPUT DATA | DATA β = -1 <br> MERGE SIGNAL = 1 <br> DATA α = 0 | DATA β = * <br> MERGE SIGNAL = 0 <br> DATA α = 0 | DATA β = 1 <br> MERGE SIGNAL = 1 <br> DATA α = 1 |

FIG.10

| INPUT | OUTPUT OF SELECTOR 66 | OUTPUT OF SELECTOR 68 |
|---|---|---|
| MERGE SIGNAL = 0 | A | B |
| MERGE SIGNAL = 1 AND $\alpha$ = 1 | A | A |
| MERGE SIGNAL = 1 AND $\alpha$ = 0 | B | B |

FIG.12

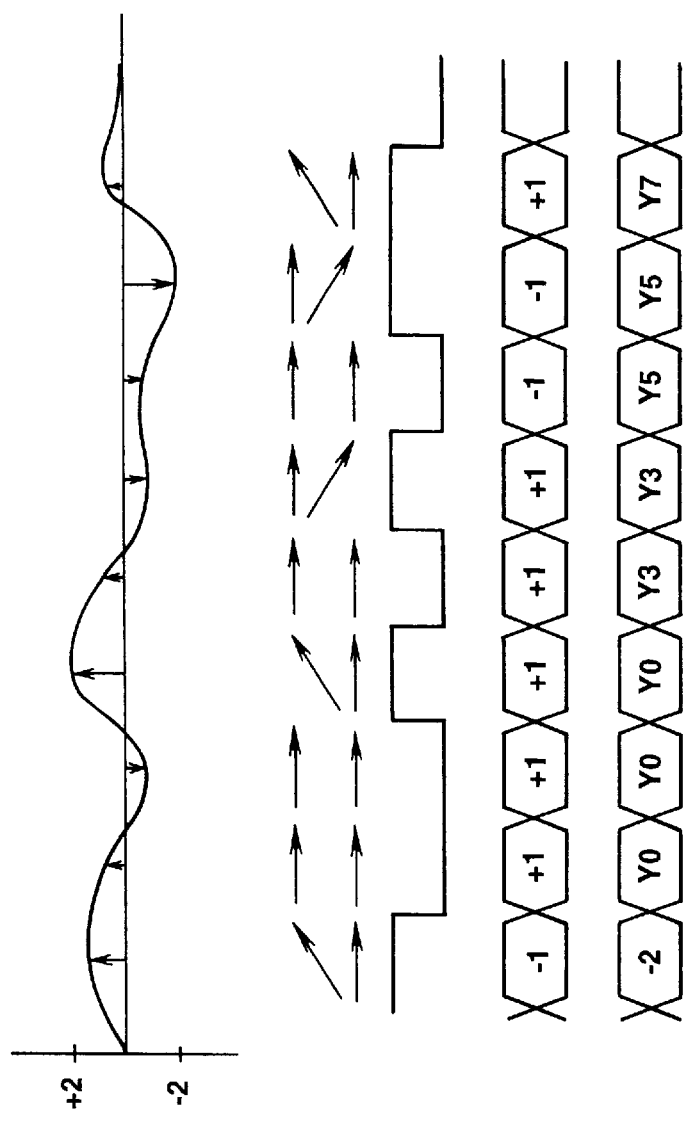

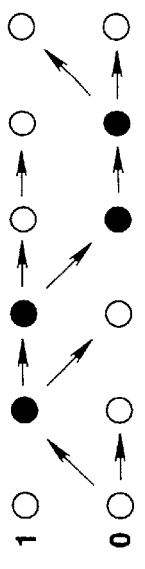
FIG.14B
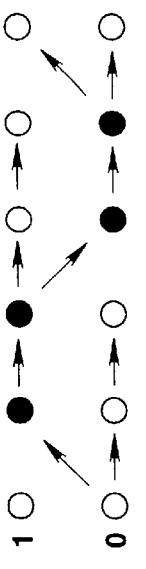
FIG.14D
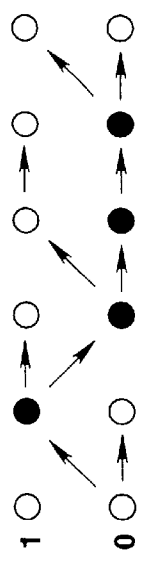
FIG.14F
FIG.14H
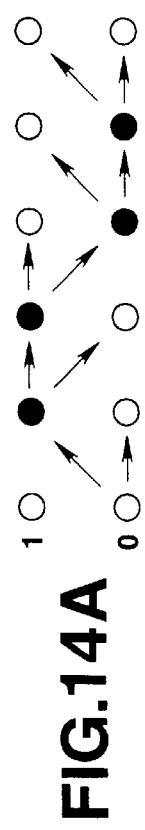
FIG.14A
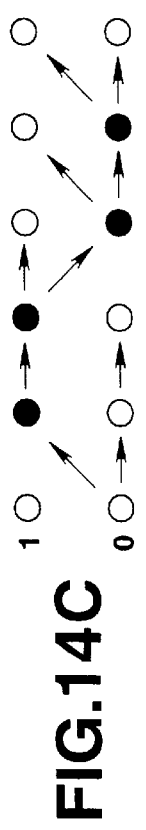
FIG.14C
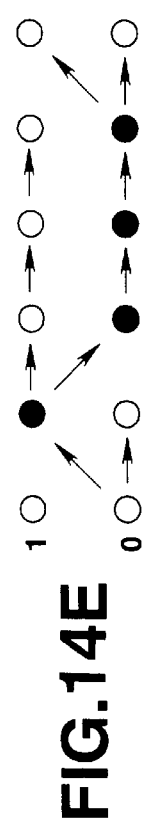
FIG.14E
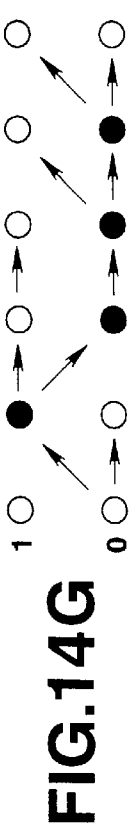
FIG.14G

| INPUT | OUTPUT OF SELECTORS 66,71 | OUTPUT OF SELECTORS 68,75 |
|---|---|---|
| MERGE SIGNAL = 0 | A | B |
| MERGE SIGNAL = 1 AND $\alpha$ = 1 | A | A |
| MERGE SIGNAL = 1 AND $\alpha$ = 0 | B | B |

FIG.19

FIG.21A FIG.21B FIG.21C FIG.21D FIG.21E FIG.21F FIG.21G FIG.21H

MAGNETIC DISK HAVING ADDRESS INFORMATION IN A FORM WHICH REPRESENTS GREY CODE BETWEEN NEIGHBORING RECORDING TRACKS AND A REPRODUCING APPARATUS THEREFOR

BACKGROUND OF THE INVENTION

1. Field of the Invention

This invention relates to a magnetic recording medium and a data reproducing apparatus. More particularly, it relates to a magnetic disk etc. in which the patterns of magnetization specifying the address information for specifying data-recording tracks represent the Grey code between neighboring tracks, and a data reproducing apparatus for reproducing data from the magnetic recording medium.

2. Description of the Related Art

In magnetic disk or floppy disk devices, a magnetic disk is employed as a magnetic recording medium. On the magnetic disk, there are formed a large number of concentrically or spirally extending data-recording tracks. Each track is divided into plural sectors in the circumferential direction. Consequently, in the magnetic disk, it is possible to specify the area for data recording or reproduction by specifying the track number, referred to herein as a track address, and a sector number, referred to herein as a sector address.

As a control system in which the recording head or the playback head is positioned in the radial direction R of the magnetic disk and holding the head at the center of a track having the targeted track address (on-track condition), there has been known a sector servo system in which the positioning servo pattern is time-divisional recorded, along with usual data, on the recording surface of the magnetic disk.

Specifically, a servo region (servo zone) is provided between neighboring sectors on the same track. In the servo zone, a track address used for rough positioning during the seek operation and a fine pattern for maintaining the on-track condition are recorded as servo patterns. The track addresses are formed in alignment with one another in a direction perpendicular to the track direction.

In general, data are recorded as inversion of magnetization, and Grey code is frequently employed as the track addresses. Specifically, the track addresses of the Grey code are extensively used in a magnetic disk. That is, the track addresses are recorded in each track by inverting the direction of magnetization in association with each bit of the Grey code. The Grey code is used for the track addresses since a code recorded in a given track differs from a code recorded on the track neighboring thereto by only one bit, so that, when the playback head traverses two tracks, the value reproduced by the playback head indicates one of the addresses of the two tracks, which is convenient for the seeking operation.

When a code such as the Grey code is employed as the track address for the magnetic disk, it is required for the code to satisfy the following requirements.

If the inversion of magnetization occurs at the same circumferential positions of the neighboring tracks, the direction of inversion of magnetization must be the same in order to prevent interference of the magnetic flux and to enable the change in the magnetic flux correctly when the playback head traverses the tracks.

With the use of a Grey code not satisfying this requirement, if, when the playback head during seeking traverses a track and has passed through a mid portion of the neighboring track, the playback signal for the track address is converted by threshold or peak detection into binary data, there is produced a value totally irrelevant to either track addresses due to the slightest noise. In addition, such value does not have the characteristics of the Grey code.

As the code satisfying the above requirement has been proposed by the present Assignee in the U.S. Pat. No. 5,274,510 which describes a Grey-like code converted from the Grey code or a code comprising the Grey-like code with a dummy bit appended thereto.

The use of the above-mentioned Grey code or the code comprised of the Grey-like code and the dummy bit leads to increased redundancy and hence to increased area required for recording the track address.

That is, if the Grey-like code etc is used, a recording area which is 1.5 to 2 times the area for recording the number of bits required for a track address is required, thus decreasing the data recording capacity of the magnetic disk.

OBJECT AND SUMMARY OF THE INVENTION

In view of the above-described status of the art, it is an object of the present invention to provide a magnetic recording medium and a data reproducing apparatus whereby the address information may be reliably reproduced with the use of a required number of bits without the necessity of adding redundancy to the address information for specifying the track even during the seek operation when the playback head traverses the track.

In one aspect, the present invention provides a magnetic recording medium in which the address information for specifying a track for data recording is recorded as the direction of magnetization, wherein the direction of magnetization corresponding to the address information represents the Grey code between neighboring tracks.

In another aspect, the present invention provides a magnetic recording medium in which the address information for specifying a track for data recording is recorded as magnetization or non-magnetization, wherein magnetization or non-magnetization corresponding to the address information represents the Grey code between neighboring tracks.

In a terminal region of the address information, terminal information formed by a predetermined direction of magnetization or magnetization or non-magnetization is recorded.

In still another aspect, the present invention provides a data reproducing apparatus comprising: a magnetic head for detecting reproduced signals from a magnetic recording medium in which the address information for specifying a track for data recording and the terminal information of the address information are recorded as the direction of magnetization, wherein the direction of magnetization corresponding to the address information represents the Grey code between neighboring tracks; and maximum likelihood decoding means for maximum likelihood decoding reproduced signals from said magnetic head for reproducing the address information.

In yet another aspect, the present invention provides a da reproducing apparatus comprising: a magnetic head for detecting reproduced signals from a magnetic recording medium in which the address information for specifying a track for data recording and the terminal information of-the address information are recorded as magnetization or non-magnetization, wherein magnetization or non-magnetization corresponding to the address information represents the Grey code between neighboring tracks, and maximum likelihood decoding means for maximum likelihood decoding reproduced signals from said magnetic head for reproducing the address information.

According to the present invention, the address information for specifying data-recording tracks is recorded on the magnetic recording medium so that the direction of magnetization or the condition of magnetization or non-magnetization corresponding to the address information and the terminal information represents the Grey code between neighboring tracks. The reproduced signals of the address information and the terminal information are maximum likelihood decoded for reproducing the address information and the terminal information corresponding to the direction of magnetization or magnetization/non-magnetization. This enables the address information to be decoded more reliably without increasing redundancy to the number of bits required as the address information whole the properties as the Grey code are maintained.

BRIEF DESCRIPTION OF THE DRAWINGS

FIG. 8 shows paths conditionally branched depending upon input values.

FIG. 10 shows the operation of the viterbi decoder.

FIG. 12 illustrates the operation of the viterbi decoder.

FIGS. 13A to 13E are timing charts for illustrating the operation of the viterbi decoder.

FIGS. 14A to 14H show patterns that can be taken by the paths.

FIG. 19 is illustrates the operation of the viterbi decoder.

FIGS. 21A to 21H show patterns that can be taken by the alternative pattern of magnetization.

DESCRIPTION OF THE PREFERRED EMBODIMENTS

Figure 1:
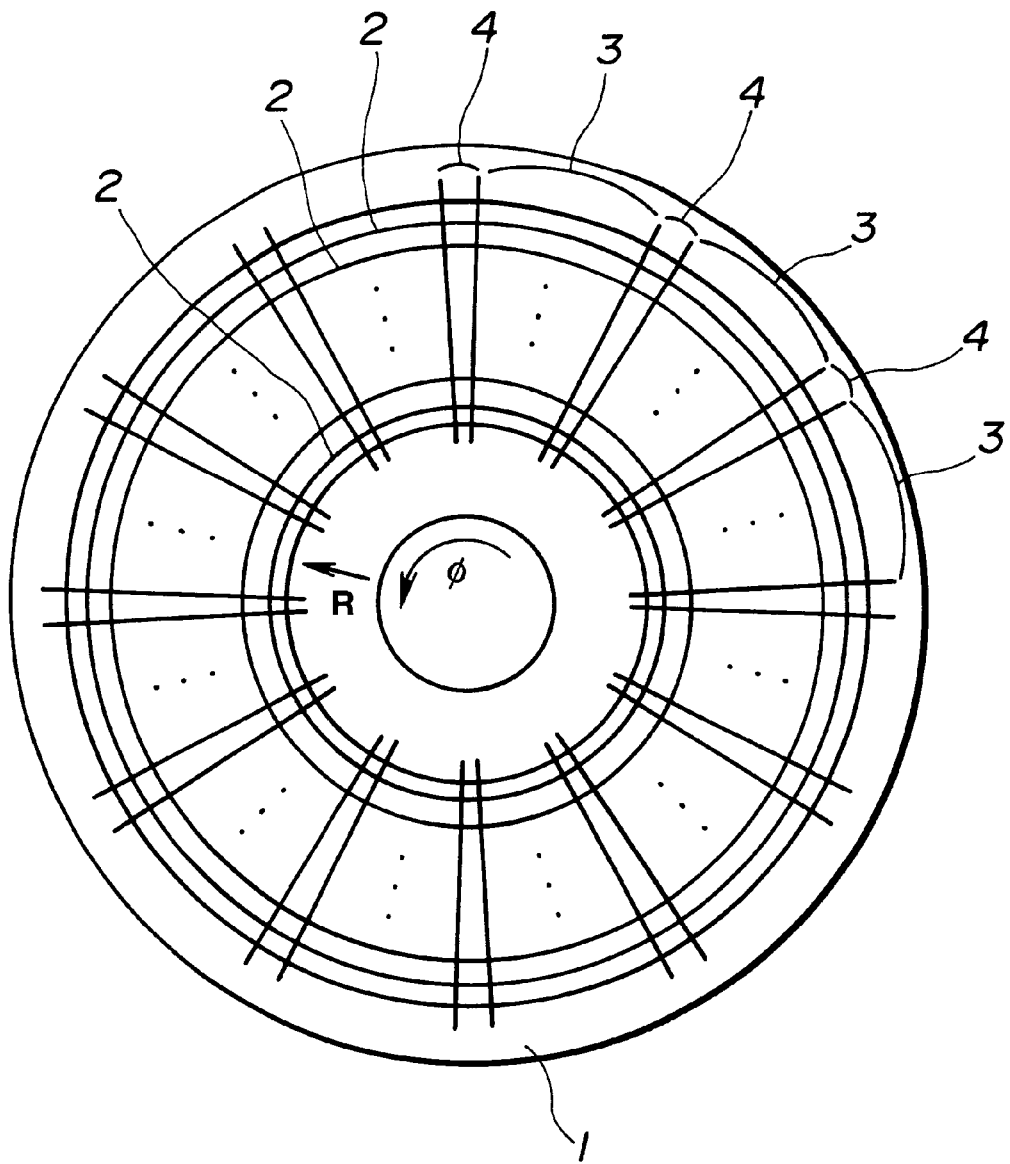
FIG. 1 is a plan view showing a format of a magnetic disk.

Referring to the drawings, preferred embodiments of a magnetic recording medium and a data reproducing apparatus according to the present invention will be explained in detail. With the present embodiment, the present invention is applied to a magnetic disk device in which a magnetic disk, for example, is employed as the magnetic recording medium and data is recorded on or reproduced from the magnetic disk.

Figure 2:
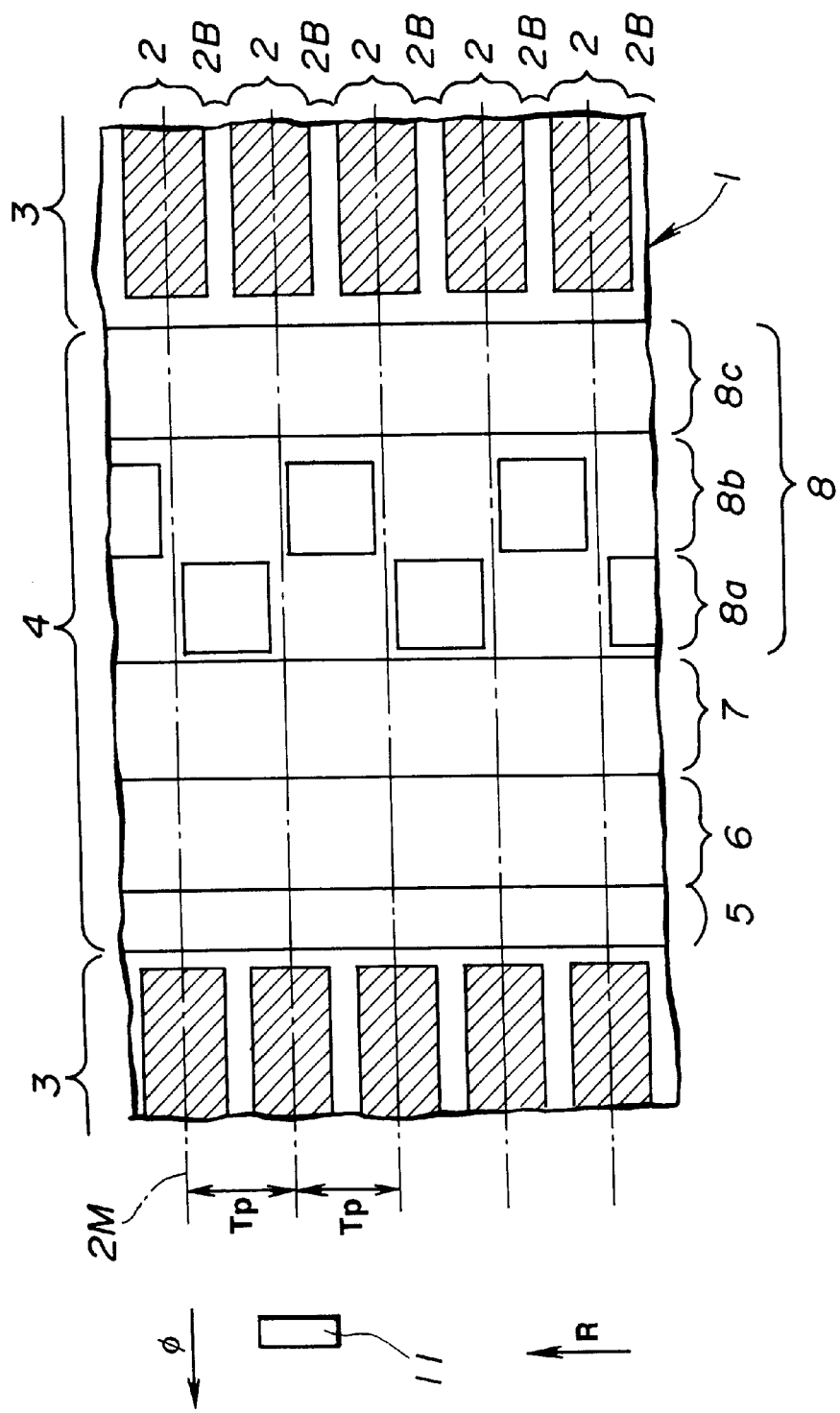
FIG. 2 is a plan view showing a servo pattern of the magnetic disk.

The magnetic disk employed in the magnetic disk device embodying the present invention is explained with particular reference to FIGS. 1 and 2.

The magnetic disk 1 is comprised of a conventional magnetic disk on the recording surface of which a large number of concentric or spirally-extending data-recording track(s) are formed, as shown in FIG. 1. Each track 2 is divided along its circumferential direction 4 into plural sectors 3. Between these sectors 3, there is formed a servo area (servo zone) 4.

Specifically, as shown in FIG. 2, a number of tracks 2 are formed on the magnetic disk 1 with a track pitch Tp in a radial direction R, and data is recorded in these sectors 3 of the respective tracks 2, as indicated by hatching. At the leading end of each track 3, there is formed an ID field etc. in which there are recorded a track address (cylinder address) and a sector address. A chain-dotted line denotes a track center 2M which is the center of the track 2. The boundary between the neighboring tracks 2 is denoted a track boundary 2B.

In the servo zone 4 arrayed between the neighboring sectors 3 on the same track are recorded, as a servo pattern, an automatic gain control (AGC) area 5 as a reference for playback signals, a header 6, a track address 7 used for rough positioning such as during the seek operation, and a fine pattern 8 used for fine positioning such as for holding the on-track condition, as shown in FIG. 2.

With the magnetic disk 1 of the illustrated embodiment, the track address 7 is recorded so that the direction of magnetization corresponds to the Grey code, with a bit magnetized in the running direction of the magnetic head being 1 and a bit magnetized in the opposite direction being 0, or vice versa, instead of with the bit representing inversion of magnetization being 1, as conventionally. The track addresses 7 are aligned in a direction perpendicular to the track 2.

Figure 3A:
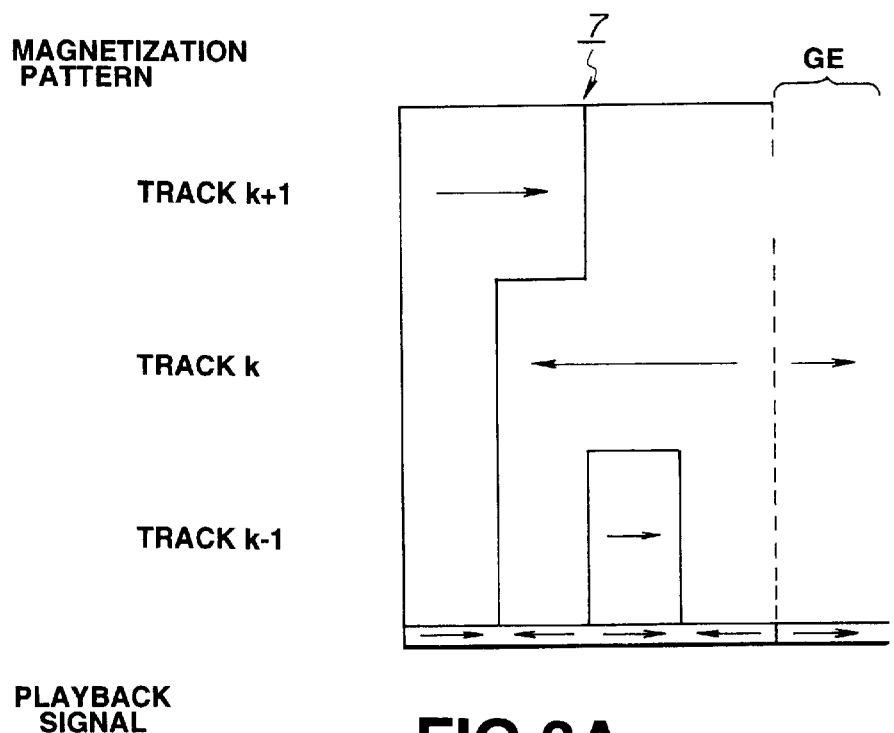
FIGS. 3A and 3B show a specific example of a magnetization pattern of the Grey code according to the present invention and the corresponding playback signals, respectively.

Specifically, with the rightward direction of magnetization and the leftward direction of magnetization in FIG. 3A being 1 and 0, respectively, the direction of magnetization corresponding to the track address is 1100, 1000 and 1010 for the tracks k+1, k and k−1, respectively. That is, the direction of magnetization differs by one bit between neighboring tracks, thus satisfying the conditions for the Grey code. It is noted that a gap area GE at a terminal end in the region in which the track address 7 is recorded and in which the track address is not recorded has a rightward direction of magnetization.

There are three fine patterns 8, that is an A-pattern 8a, a B-pattern 8b and a C-pattern 8c.

The servo pattern such as the track address 7 is pre-recorded by a servo track writer. The servo pattern may be recorded by removing part of the magnetic material or forming micro-irregularities on the disk instead of by employing the servo writer.

Figure 4:
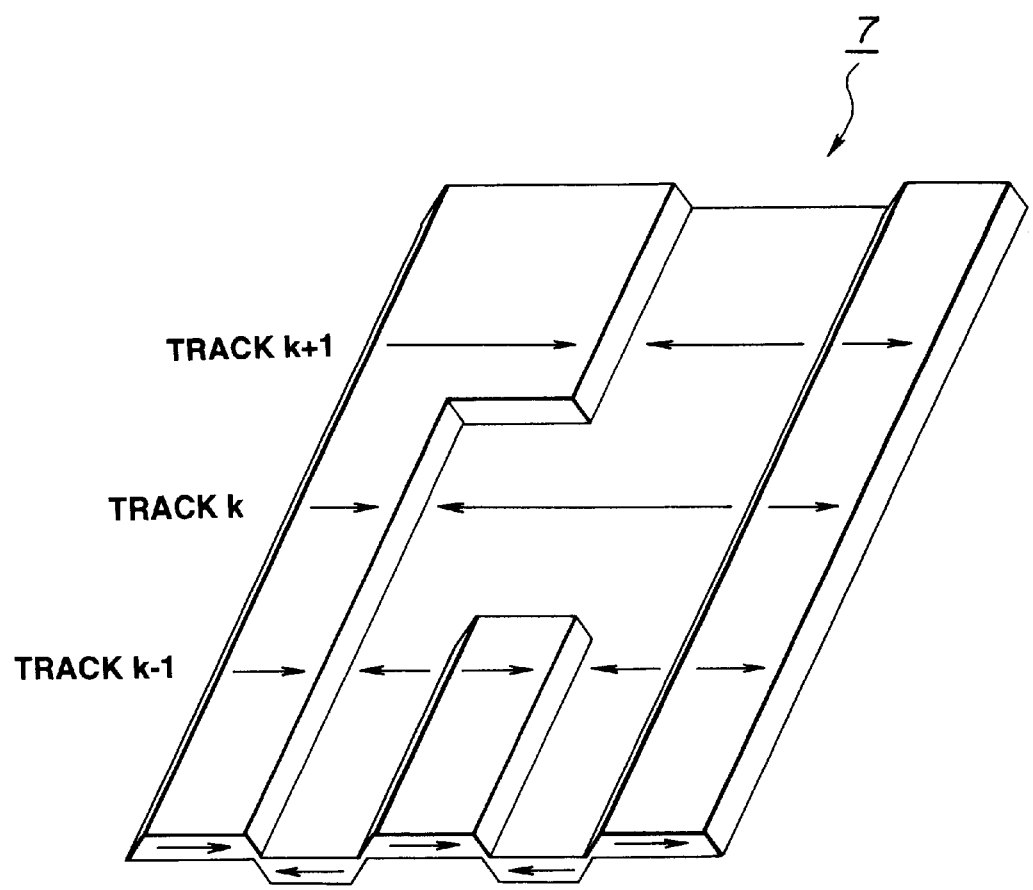
FIG. 4 shows another specific example of a magnetization pattern of the Grey code according to the present invention.
Figure 5:
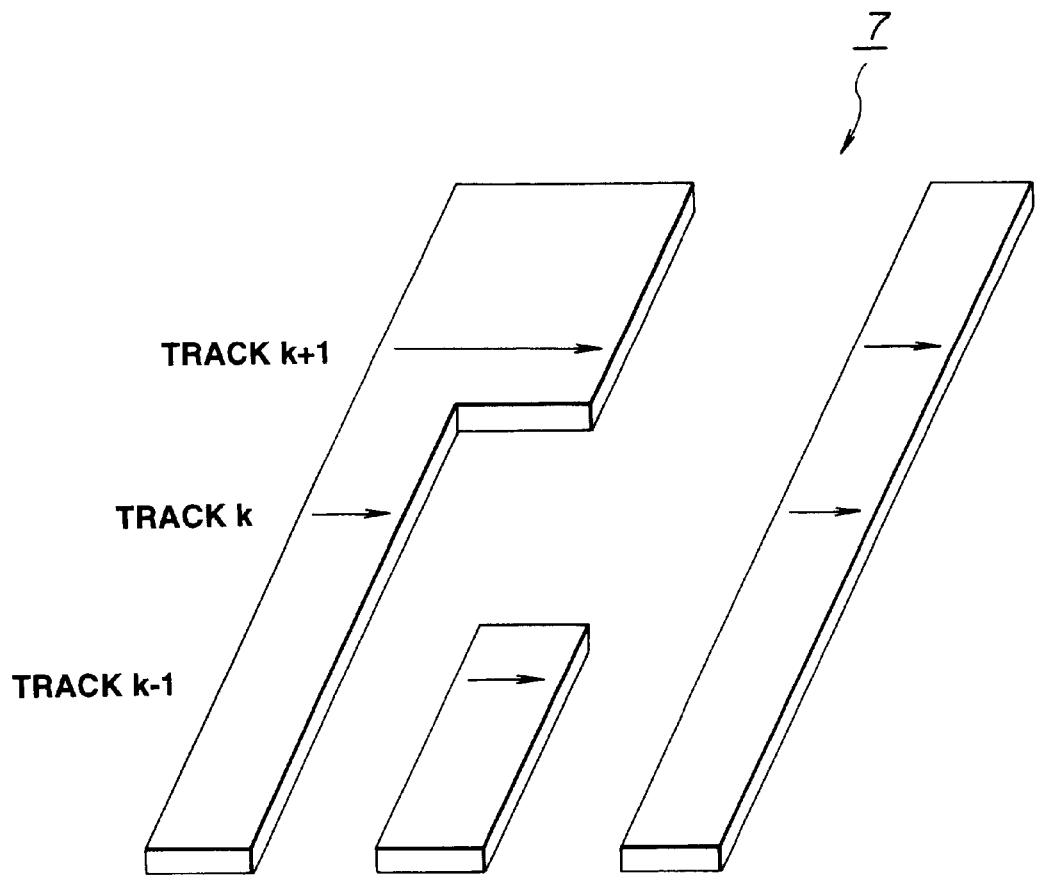
FIG. 5 shows still another specific example of a magnetization pattern of the Grey code according to the present invention.

Specifically, the track address is recorded so that the direction of magnetization corresponding to the track address represents the Grey code between neighboring tracks, with the region of rightward magnetization being convex and the region of leftward magnetization being concave, as shown in FIG. 4. Alternatively, the track address is recorded so that the state of magnetization and the state of non-magnetization corresponding to the track address represents the Grey code between neighboring tracks, with the state of magnetization being 1 and the state of non-magnetization being 0, as shown in FIG. 5.

With the magnetic head in the on-track condition, the magnetic disk 1 is rotated in the circumferential direction φ, whereby the magnetic head scans the track center 2M under servo control. That is, if the magnetic head is in the on-track condition, it is substantially at the same position along the radius R of the magnetic disk 1. In the seek state, the magnetic head 1 is moved along the radius of the rotating magnetic disk 1, thus scanning the track boundary 2B.

A magnetic disk device for recording or reproducing data on or from the magnetic disk 1 is explained.

Figure 6:
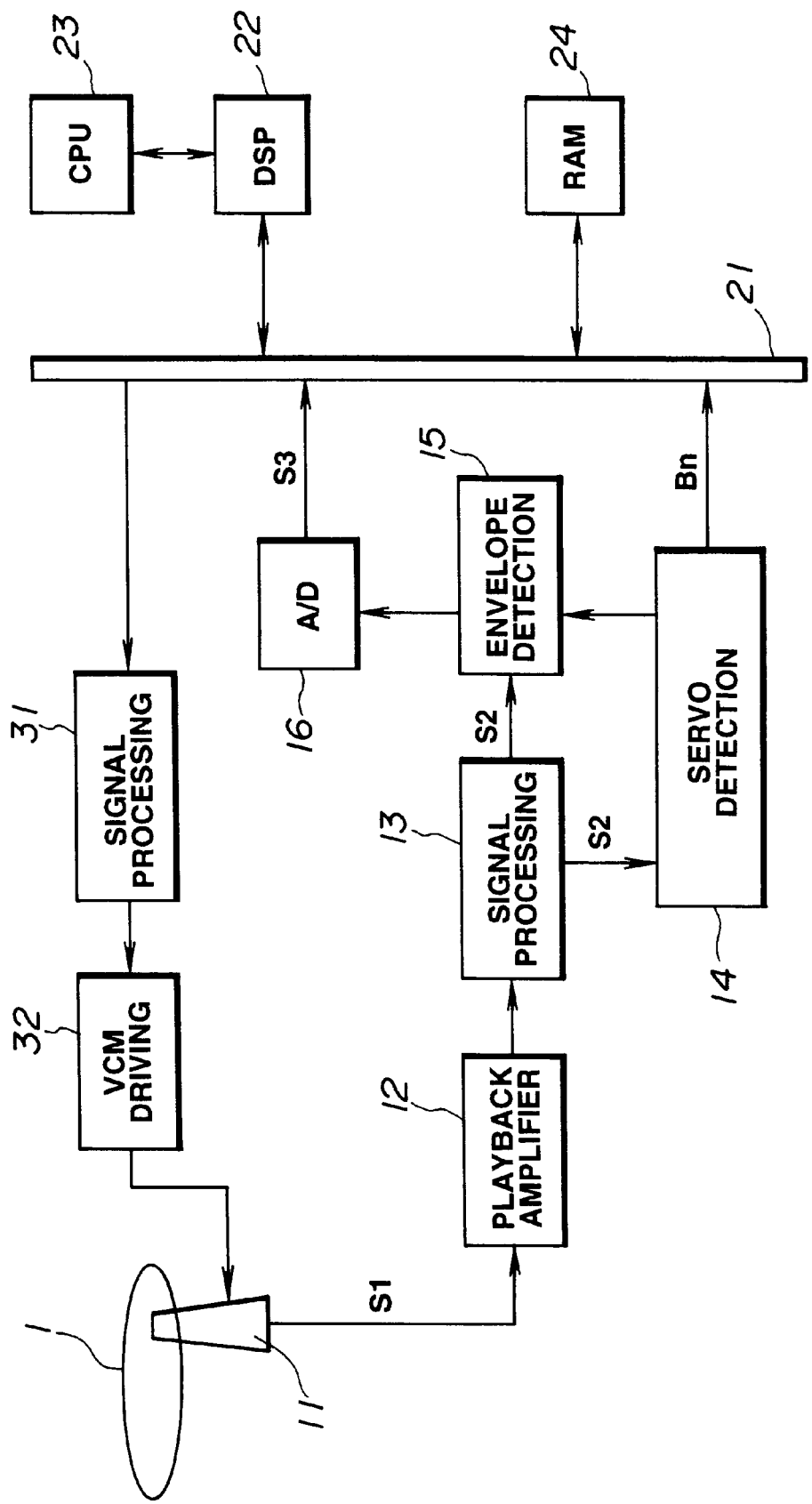
FIG. 6 is a block diagram showing an illustrative construction of a magnetic disk apparatus according to the present invention.

Referring to FIG. 6, the magnetic disk device according to the present invention includes a magnetic head 11 for recording or reproducing data, and a playback amplifier 12 for amplifying playback signals from the magnetic head 11. The magnetic disk device also has a signal processing circuit 13 for adjusting the level of the playback signal from the playback amplifier 12 and a servo detecting circuit 14 for most likelihood decoding the playback signal from the signal processing circuit 13 for detecting the track address. The magnetic disk device also includes an envelope detection circuit 15 for detecting the envelope of the playback signals from the signal processing circuit 13 and an analog/digital (A/D) converter 16 for converting the envelope of the playback signal from the envelope detection circuit 15 into digital signals.

The magnetic disk device also includes a digital signal processor (DSP) 22 for driving the magnetic head 11 based upon the track address from the servo detection circuit 14 and a central processing unit (CPU) 23 for controlling the magnetic disk device in its entirety. The magnetic disk device also includes a random access memory (RAM) 24 for storing the track addresses etc from the servo detection circuit 14 and a signal processing circuit 31 for converting control data from the DSP 22 into pulse signals. Finally, the magnetic disk device includes a video coil motor (VCM) driving circuit 32 for driving the magnetic head 11.

The magnetic head 11 is arranged for being moved substantially along the radius R in a facing relation to the magnetic disk 1 rotated in the circumferential direction φ by, for example, a spindle motor. During seeking, the magnetic head 11 is moved substantially along the radius R and, during data recording or reproduction, there is relative movement in the circumferential direction φ with respect to the magnetic disk 1.

The playback operation of the above-described magnetic disk device is explained.

The playback signals corresponding to the inversion of magnetization, referred to herein as RF signals S1, are continuously detected by the magnetic head 11 and supplied to the playback amplifier 12. The playback amplifier 12 amplifies the RF signals S1 and transmits the amplified signals to the signal processing circuit 13.

The signal processing circuit 13 is comprised of a series connection of an automatic gain control (AGC) circuit and a low-pass filter (LPF) and is configured for amplifying the RF signals S1 supplied from the playback amplifier 12 so that the level for the AGC area 5 of the servo zone 4 will be constant, and for removing high-frequency noise components for transmitting the resulting RF signal S2 to the servo circuit 14 and to the envelope detection circuit 15.

The servo detection circuit 14 has a maximum likelihood decoder etc. and most-likelihood decodes the RF signals for the track address 7 of the servo zone 4 for reproducing a track address composed of binary data Bn for supplying the track address over bus 21 to the DSP 22.

On the other hand, the envelope detection circuit 15 detects the envelope of the RF signal S2 for the fine pattern 8 of the servo zone 4. The A/D converter 16 digitizes the envelope to generate playback data S3 which is supplied over a bus 21 to the DSP 22.

During data reproduction, the DSP 22 effects servo control of holding the magnetic head 11 on the track center 2M on the basis of the playback data S3 supplied from the envelope detection circuit 15, that is by comparing the A-pattern 8a, B-pattern 8b and the C-pattern 8c of the fine pattern 8 for achieving the on-track condition.

The DSP 22 causes the magnetic head 11 to seek the track 2 specified by the seek command issued by the CPU 23 for achieving the on-track condition. That is, the DSP 22 generates data for shifting the magnetic head 11 along the radius R, on the basis of the binary data Bn as the playback data for the track address 7 and the playback data S3 of the fine pattern 8, and transmits the data to the signal processing circuit 31. Meanwhile, speed profile data etc. for seeking are previously stored in a RAM 25 and the DSP 22 reads out these data as the occasion may require in order to effect seek control of the magnetic head 11.

The signal processing circuit 31 includes a pulse width modulating circuit, a tertiary filter and a D/A converter and, during data reproduction, converts the data supplied from the DSP 22 over bus 21 for achieving the on-track condition of the magnetic head 11 into pulse widths, while converting the pulse width data into analog PWM signals which are routed to the VCM driving circuit 32.

During seeking, the signal processing circuit 31 converts data supplied from DSP 22 over bus 21 into pulse widths while converting the pulse widths into analog PWN signals which are supplied to the VCM driving circuit 32.

Based upon these PWM signals, the VCM driving circuit 32 drives the voice coil configured for shifting the magnetic head 11 along the radius R of the magnetic disk 1. That is, the DSP 22 controls the duty of the PWM signals for driving the magnetic head 11. Thus, during data reproduction, the magnetic head 11 is servo-controlled so as to be on-track and data reproduction is done with the magnetic head 11 being on-track. During seeking, the magnetic head 11 is caused to seek the track having the targeted track address. Serial numbers are accorded to the track addresses 7 pre-recorded on the servo zone 4 of the magnetic disk 1 beginning from the outer most track up to the inner most track 2.

The maximum likelihood decoding is now explained.

In a magnetic disk device, the technique of partial response is frequently employed. Among different sorts of partial response techniques 15, the partial response (1, 1), referred to herein as PRS (1, 1), PRS(1, −1) and PRS(1, 0, −1). The corresponding system polynominals may be given by the following equations 1, 2 and 3:

$$G(D)=1+D \quad (1)$$

$$G(D)=1-D \quad (2)$$

$$G(D)=1-D^2 \quad (3)$$

where D denotes one-bit delay. For example, if the lone information 1 is entered as an input, that is if data 001000 in binary representation enters a channel associated with the PRS(1,1), the corresponding output is 0001100. If the same data enters a channel associated with the PRS (1, −1), the corresponding output is 0001-100.

Since the magnetic recording/reproducing system exhibits differentiating characteristics, it has characteristics close to PRS(1, −1). Thus the servo detection circuit 14 effects maximum likelihood decoding associated with the PRS (1, −1).

On the other hand, if the maximum level of the RF signal S1 outputted from the playback amplifier 12 is ±2, the RF signal S1 assumes one of the values −2, 0 and +2. These values may be decoded into binary data by three-valued level detection employing a fixed threshold value and viterbi decoding which is the maximum likelihood decoding. In the three-valued level detection, threshold values are set between the values 0 and +2 and between the values 0 and −2 and it is checked in which of the regions the values of the sampling points are located in order to effect decoding. The detection capability is not high despite the simplified circuit construction. The viterbi decoding, which is the maximum likelihood decoding, effects decoding by detecting the path with the highest likelihood in the so-called Trellis diagram with the aid of the values of continuous sample points, and has a detection capability higher than that with the three-valued level detection.

The viterbi decoding is now explained.

Figure 7:
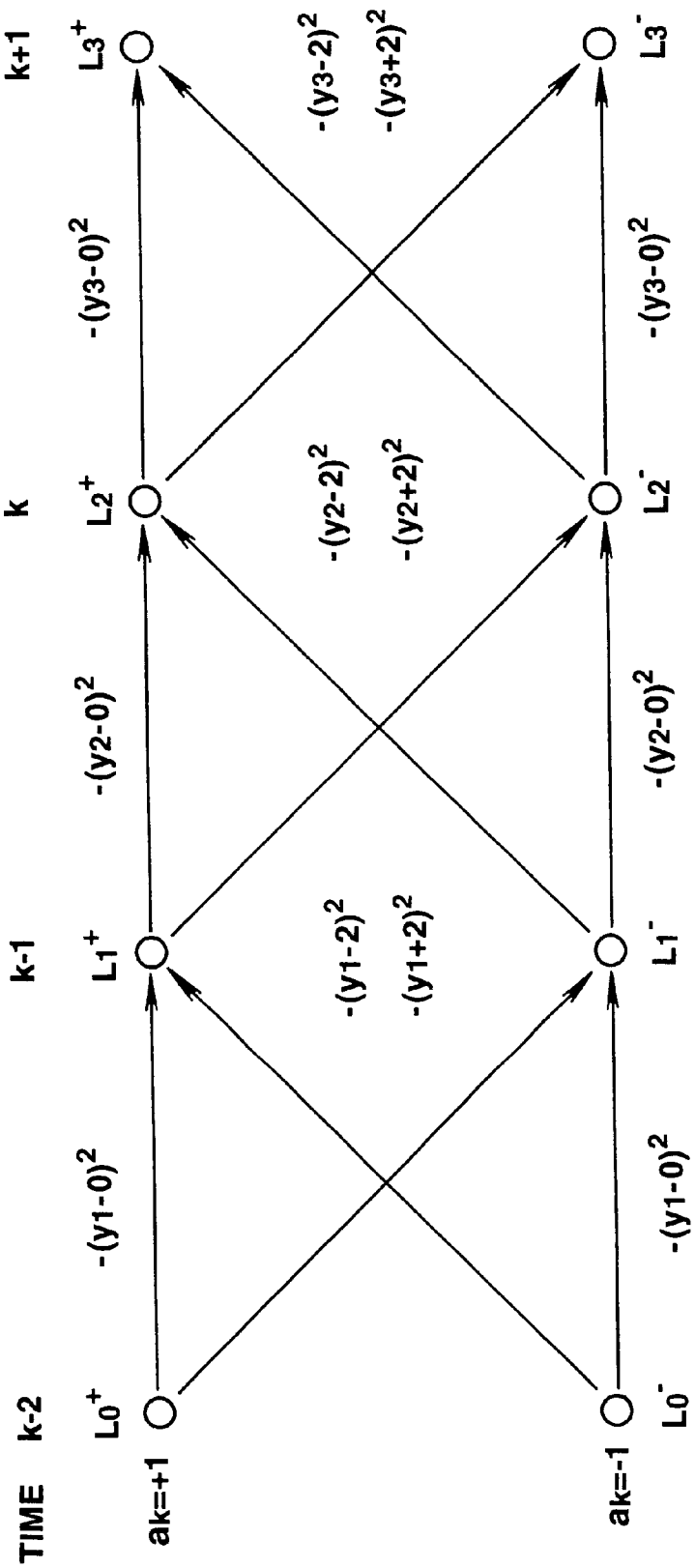
FIG. 7 is a Trellis diagram for PRS (1, −1).

The algorithm of viterbi decoding is to determine data by checking respective states at a given time point $\underline{k}$ for selecting out only one path which will give the maximum likelihood (metric) until reaching the states will be maximum. In FIG. 7, there is shown a Trellis diagram in viterbi decoding for PRS(1, −1) in which so-called branch metric is also shown.

For finding a path which will give the maximum total sum of the branch metric, path metrics $L_k^+$, $L_k^-$ up to a sample time point $\underline{k}$ may be found by the following equations 4 and 5 using the values of the path metrics $L_{k-1}^+$, $L_{k-1}^{-31}$ up to a time point k−1 for a directly previous sample. In the equations, max(A, B) denotes that A or B, whichever is larger, is selected.

$$L_k^+ = \max(L_{k-1}^+ + (-(y_k - 0)^2), L_{k-1}^- + (-(y_k - 2)^2)) \quad (4)$$

$$L_k^- = \max(L_{k-1}^+ + (-(y_{k+2})^2), L_{k-1}^- + (-(y_k - 0)^2)) \quad (5)$$

For obtaining an optimum path while calculating these path metrics $L_k^+$ and $L_k^-$, three squarers, six adders and two comparators are required. In addition, a serial shift/parallel shift register is required for storing the path.

In the present embodiment, so-called differential metric algorithm is employed for simplifying the circuit without faithfully calculating the path metric. If there are only two states as in the case of the viterbi decoding for the above-mentioned PRS(1, −1), there are only three patterns of the branch which survive at a certain time point, namely state<−1>→state<−1> and state<−1>→state<+1> state<−1>→state<−1> and state<+1>→state<+1> state<+1>→state<+1> and state<+1>→state<+1>

These patterns are written as →↑, →→ and →↓, respectively. That is, there cannot exist the pattern of state<+1>→state<−1> and state<−1>→state<+1>

In viterbi decoding, which pattern will survive is judged for each of these branches while calculating path metrics.

Since there are only two states, the difference of the path metrics ΔL, referred to herein as differential metric, is found by the following equation (6), and which pattern will survive is judged using the differential metric ΔL.

$$\Delta L = L_k^+ - L_k^- = \max(L_{k-1}^+, L_{k-1}^- + 4y_{k-4}) - \max(L_{k-1}^+ + 4y_{k-4}, L_{k-1}^-) = -\Delta L_{k-1} + 8y_k - \min(4, 4y_k - \Delta L_{k-1}) - \max(-4, 4y_k - \Delta L_{k-1}) \quad (6)$$

That is, since the branches have $4y_k - \Delta L_{k-2}$ i common, it can be shown which of the branches is to be selected by comparing the value to 4 and −4 and by judging which is larger. Therefore, by calculating the differential metric ΔL, it can be judged which of the above-mentioned pattern branch has survived.

In other words, the path can be determined by calculating the differential metric without the necessity of calculating the path metric itself. If the equation (6) is modified in three ways depending upon the value of $4y_k - \Delta L_{k-2}$, the following equations (7) to (9) are derived:

$$\Delta L_k = 4y_{k-4} \quad (4 < 4y_k - \Delta L_{k-1}) \quad (7)$$

$$= \Delta L_k \quad (-4 < 4y_k - \Delta L_{k-1} < 4) \quad (8)$$

$$= 4y_{k+4} \quad (4y_k - \Delta L_{k-1} < -4) \quad (9)$$

Further, if the equations (7) to (9) are modified by setting $\Delta L_k = 4y_p - 2\beta$, the following equations (10), (11) and (12) are obtained.

$$y_p - \beta = y_k - 1 \quad (-\beta + 1 < y_k - y_p) \quad (10)$$

$$= y_p - \beta \quad (-\beta - 1 < y_k - y_p < -\beta + 1) \quad (11)$$

$$= y_k + 1 \quad (y_k - y_p < -\beta - 1) \quad (12)$$

It is noted that data β assumes one of two values −1 or +1 and represents a transition pattern at the directly previous state transition candidate (location p). That is, data β represents the sorts of transitions at a point where, retrogressive from the current time point, transition other than the initial parallel path →, ↑ or →, ↓ may be thought of as candidates. In other words, data β plays the role of adding an offset to a threshold value for judgment as long as the equation is concerned, while data $y_p$ is the value of the data $y_k$.

If, for example, →, ↑ seems to have occurred in a directly previous branch (the last branch not yet determined) β=+1, and the condition of judgement and the updating rule for data β and data $y_p$ at such time are as shown for example in FIG. 8.

If the viterbi decoder is constituted based upon such algorithm, it suffices to use zero squarer, one adder and two comparators.

A first illustrative construction of the servo detection circuit 14 for reproducing a track address by the above-described viterbi decoding is explained.

First Embodiment

Figure 9:
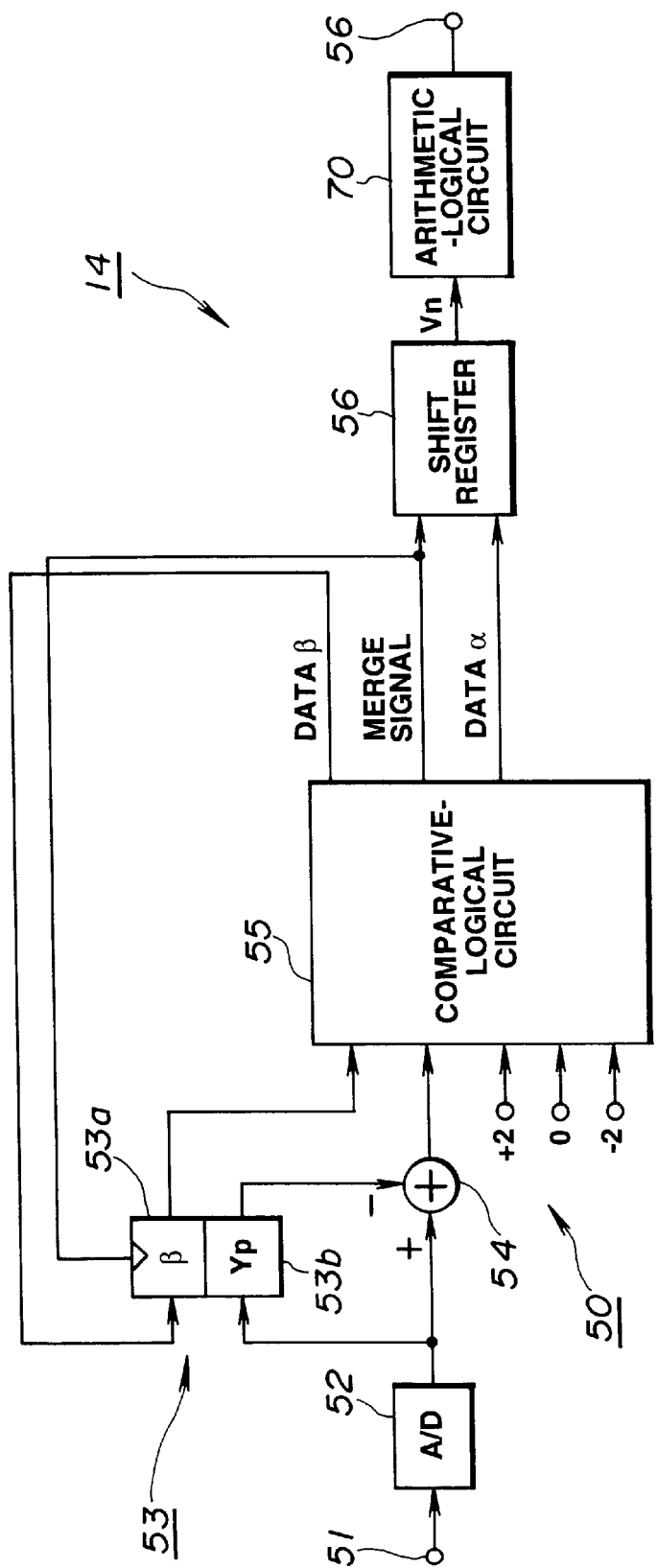
FIG. 9 is a block diagram showing an illustrative construction of a viterbi decoder constituting the magnetic disk apparatus.

The servo detection circuit 14 has a viterbi decoder 50 and an arithmetic-logical circuit 70 for converting an output of the viterbi decoder 50 into a track address, as shown for example in FIG. 9.

Referring to FIG. 9, the viterbi decoder 50 includes an A/D converter 52 for converting an RF signal S2 supplied from the signal processing circuit 13 into digital signals, and a latch circuit 53 for storing data $y_k$ from the A/D converter 52 as data $y_p$. The viterbi decoder also includes a subtractor 54 for subtracting data $y_p$ latched by the latch circuit 53 from the data $y_k$ from the A/D converter 52 and a comparative-logical circuit 55 for comparing the output of the subtractor 54 to a pre-set threshold value. The viterbi decoder also includes a shift register 56 for determining the path of the trelis diagram for viterbi decoding.

The A/D converter 52 converts the portion of the RF signal S2 supplied via the terminal 51 from the signal processing circuit 13 into digital signals and transmits the resulting signal to the latch circuit 53 and the subtractor 54.

The latch circuit 53 is made up of two latch circuits 53a, 53b, for example, with the latch circuit 53b holding on memory the data $y_k$ from the A/D converter 52 as data $y_p$ based upon a merge signal as later explained. The subtractor 54 subtracts the data $y_p$ stored in the latch circuit 53b from the data $y_k$ supplied from the A/D converter 52 t o transmit the resulting data to the comparator-logical circuit 55.

The comparator-logical circuit 55 is fed with data β from he latch circuit 53b and threshold values +2, 0 and −2 from the latch circuit 53b, in addition to the output of the subtractor 54. The comparator-logical circuit 55 performs comparative logical operations on these input data for generating new data β, merge signal and data α.

Specifically, the comparative-logical circuit 55 compares the output of the subtractor 54, that is $y_k-y_p$, to +2, 0 and −2, and sets conditions J1, J2 and J3 if $y_k-y_p \leq -2$, $y_k-y_p \leq 0$ and $0<y_k-y_p$, with the data β from the latch circuit 53a being 1, respectively, as shown in FIG. 10. Also the comparator-logical circuit 55 sets conditions J7, J8 and J9 if $y_k-y_p<0$, $0 \lceil y_k-y_p<+2$ and $+2 \lceil y_k-y_p$, with data β being 1, respectively.

For the conditions J1, J3, J7 and J9, the comparator-logical circuit 55 sets the merge signal to 1 and outputs the data, while setting the data β to −1, 1 , −1 and 1 for the conditions J1, J3, J7 and J9 and outputs the data. For the conditions J2 and J8, the comparator-logical circuit 55 sets the merge signal to 0 and outputs the data. On the other hand, for the conditions J1, J2, J3, J7, J8 and J9, the comparator-logical circuit 55 sets data α to 1, 0, 0, 0, 0, 1 and outputs the resulting data.

The comparator-logical circuit 55 sends the data β and the merge signal thus found to the latch circuit 53, while sending the merge signal and the data a to the shift register 56.

For the merge signal equal to 1, the latch circuits 53a, 53b perform latch operations. That is, the latch circuits 53a, 53b perform latch operations, that is latch (store) −1, 1 and the previous value of β, for the conditions J1 or J7, J3 or J9 and J2 or J8, respectively. On the other hand, the latch circuit 53b stores, for the conditions J1, J3, J7 and J9, the currently entered data $y_k$ as data $y_p$.

Figure 11:
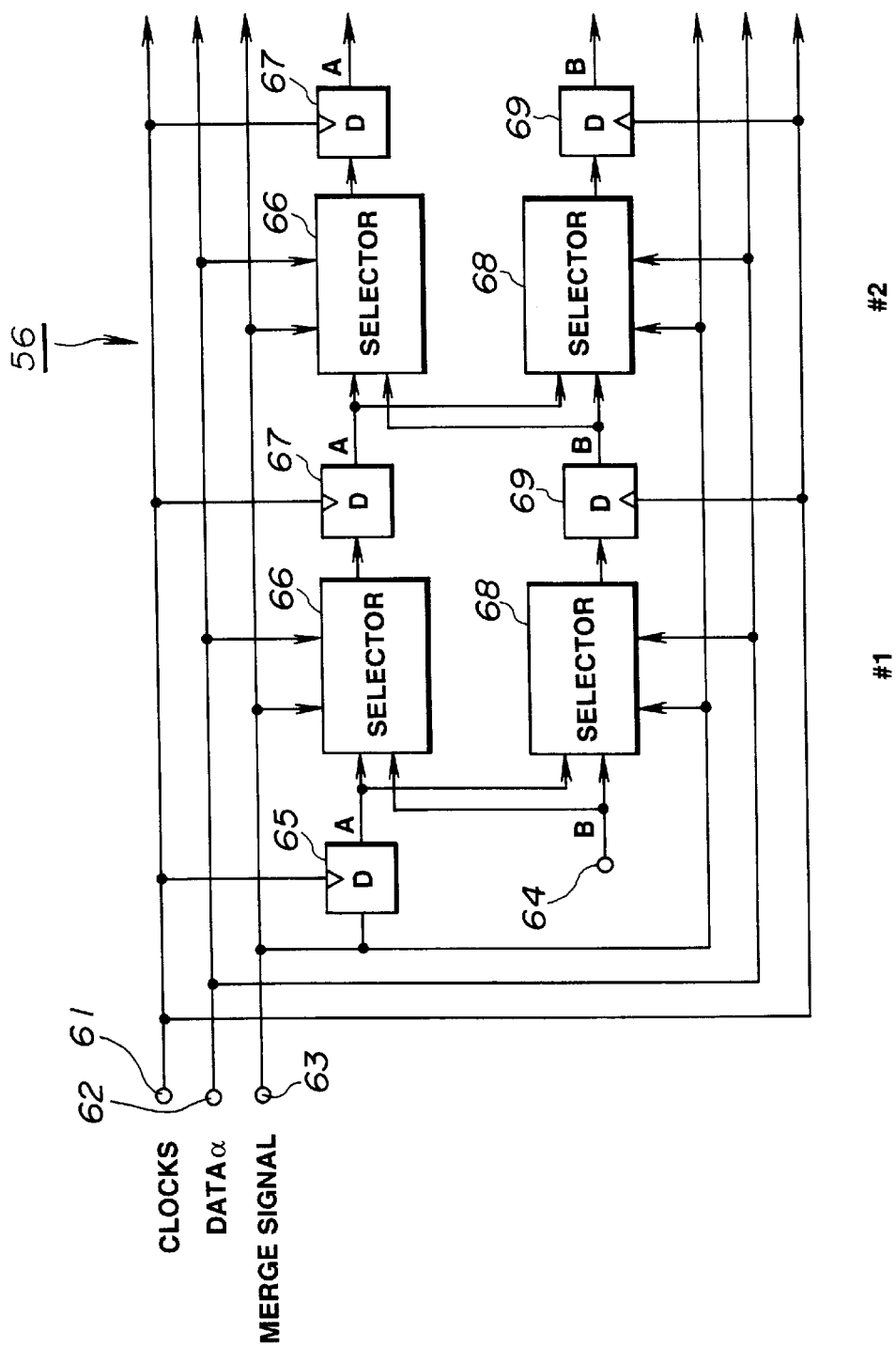
FIG. 11 is a circuit diagram showing an illustrative construction of a shift register constituting the viterbi decoder.

The shift register 56 has two parallel load/serial shift resisters, that is, two shift registers comprised of an upper side circuit made up of cascaded N selectors 66 and N latch circuits 67 and a lower side circuit made up of cascaded N selectors 68 and N latch circuits 69, as shown in FIG. 11. The shift register 56 also has a latch circuit 65 for latching the merge signal from the comparator-logical circuit 55.

The respective stages of the shift register 56 are connected so that outputs of the #nth stage latch circuits 67, 69 are supplied to the (#n+1)st selectors 66, 68, while data α and the merge signal from the comparator-logical circuit 55 are supplied via terminals 62, 63 as selection signals via terminals 62, 63, respectively. The #1st stage selector 66 is fed with an output of the latch circuit 65 fed with the merge signal via terminal 63, while the selector 68 is fed with 0 via terminal 64.

The latch circuits 65, 67 and 69 are D-flipflops and perform latch operations in synchronism with clocks supplied via a terminal 61. The result is that the merge signal via terminal 63 and "0" supplied via terminal 64 are shifted towards the right by one step with each clock. Specifically, if the merge signal is 0, the #(n+1)st stage selector 66 selects and outputs an output A of the #nth latch circuit 67, while the #(n+1)st selector 68 selects and outputs an output B of the #nth stage latch circuit 67, as shown in FIG. 12. That is, the upper stage signal is shifted to the upper side circuit, while the lower stage signal is shifted to the lower side circuit. On the other hand, if the merge signal is 1 and the data α is 1, the #(n+1)st stage selectors 66, 68 select and output the output A of the #nth stage latch circuit 67. That is, the upper stage signals are shifted to the upper and lower side circuits. If the merge signal is 1 and the data α is 0, the #(n+1)st selectors 66, 68 select and output the output b of the #nth latch circuit 69. That is, the lower stage signal is shifted towards the upper and lower side circuits. In other words, since the merge signal equal to 0 indicates a parallel path, the shift registers shift one stage independently of each other. Since the merge signal=1 indicates that the path merges, the contents of the upper side circuit or the lower side circuit are copied in the opposite side series depending on the value of the data α.

Thus, the final stage latch circuit 67 of the upper side shift register outputs playback data as binary data Vn.

The operation of the viterbi decoder 50 fed via a terminal 51 with an RF signal S2 from the signal processing circuit 13 as shown in FIG. 13A is hereinafter explained. The initial values of the data $y_p$ and the data β at k=0 are −2 and −1, respectively, as shown in FIGS. 13D and 13E.

If an RF signal S2 as shown in FIG. 13A enters the viterbi decoder 50 at k=0, the A/D converter 52 enters data $y_0$ of 1.6 to the subtractor 54. More concisely, the data $y_0$ equal to 1.6 is entered at k=0.

Since $y_k y_p > 2$, the comparator-logical circuit 55 judges that the condition is J9, that is that the branching is an upward branching as shown in FIG. 13B, so that it outputs data β, merge signal and the data α as +1, 1 and 1, respectively. The latch circuit 53a latches (stores) +1 as data β, as shown in FIG. 13D, while the latch circuit 53b latches (stores) +1 as data β, and data $y_0$ as data $y_p$ (p=0) as shown in FIG. 13E. The upper side latch circuit 65 of the shift register 56 stores 1 (merge signal) as a candidate.

If, at k=1, data $y_1$ is entered as 0.2, since $-2<y_k-y_p \leq 0$, the comparator-logical circuit 55 judges that the condition is J2, that is, the path is parallel, and sets and outputs the merge signal and data α equal to 0. Thus the latch circuit 53a holds data β (+1) unchanged, while the latch circuit 53b holds the data $y_p$ ($y_0$) unchanged. At this time, the #(n+1)st stage selectors 66, 68 select outputs A, B of the #nth stage latch circuits 67, 69. That is, the upper and lower side shift registers 56 shift one stage towards right. Specifically, the #1st stage latch circuits 67, 69 hold 1, 0 on memory, respectively, while the latch circuit 65 holds 0 (merge signal) on memory.

If, at k=2, data $y_2$ is entered as −0.2, since $-2<y_k-y_p \leq 0$, the comparator-logical circuit 55 judges that the condition is J2, that is, the path is parallel, and outputs the merge signal equal to 0 and the data α as 0. Thus the latch circuit 53a holds data β (+1) unchanged, while the latch circuit 53b holds the data $y_p$ ($y_0$) unchanged. The #(n+1)st state selectors 66, 68 select outputs A, B of the #nth stage selectors 67, 69, respectively. That is, the upper and lower side shift registers 56 shift one stage towards right. Specifically, the #1st stage latch circuits 67, 69 hold 0 in memory, while the #2nd stage latch circuits 67, 69 hold 0 in memory and the #2nd stage latch circuits 67, 69 hold 1, 0 on memory, respectively. The latch circuit 65 holds 0 (merge signal) in memory.

If, at k=3, the data $y_3$ is entered as 2, since $y_k-y_p>0$, the comparator-logical circuit 55 judges that the condition is J3, that is, the branching is upward branching. Thus the circuit sets and outputs the data β, merge signal and the data α as being equal to +1, 1 and 0, respectively. The latch circuit 53*a* holds +1 as data β, while the latch circuit 53*b* holds data $Y_3$ as data $y_p$ (p–3). The #(n+1)st selectors 66, 68 select the output B of the #nth stage latch circuit 69. That is, the candidate previously stored in the upper side circuit is found to be not correct and the contents of the lower stage shift register 56 are copied in the upper stage. Specifically, all of the latch circuits of the #1st and #3rd stage latch circuits 67, 69 hold 0 in memory. The latch circuit 65 holds 1 (merge signal) as a candidate.

If, at k=4, the data $y_4$ is entered as 0.2, since $-2<y_k-y_p<0$, the comparator-logical circuit 55 judges that the condition is J2, that is, the path is parallel, and outputs the merge signal and data $\geq$ as 0. Thus the latch circuit 53*a* holds data β (+1) unchanged, while the latch circuit 53*b* holds the data $y_p$ ($y_3$) unchanged. The #(n+1)st stage selectors 66, 68 select outputs A, B of the #nth stage latch circuits 67, 69. Specifically, the #1st stage latch circuits 67, 69 hold 1, 0 on memory, while the latch circuits 67, 69 of the #2nd and #4th latch circuits 67, 69 hold 0 on memory. Only the latch circuits holding 1 on memory will now be explained. The latch circuit 65 holds 0 (merge signal) on memory.

If, at k=5, data $y_5$ is entered as –0.4, since $y_k \leq -2$, the comparator-logical circuit 55 judges that the condition is J1, that is, the branching is downward. Thus it sets the data β and the merge signal to –1 and 1, respectively. The latch circuit 53*a* holds –1 as data β, while the latch circuit 53*b* holds data $y_5$ as data $y_p$ (p=5). The #(n+1)st stage selectors 66, 68 select outputs A of the #nth stage latch circuit 67. That is, since the candidate previously stored in the upper side circuit is correct, the contents of the upper state circuit of the shift register 56 are copied in the lower stage circuit. Specifically, the #2nd stage latch circuits 67, 69 hold 1 on memory. On the other hand, the latch circuit 65 holds 1 (merge signal) on memory as a candidate.

If, at k=0, data $y_6$ is entered as –0.2, since $0 \leq y_k-y_p<+2$, the comparator-logical circuit 55 judges that the condition is J8, that is, the path is parallel, and outputs the merge signal and the data α as being equal to 0. Thus the latch circuit 53*a* holds data β (–1) unchanged, while holding the data $y_p$ ($y_5$) unchanged. The #(n+1)st stage selectors 66, 68 select outputs A, B of the #nth stage latch circuits 67, 69, respectively. That is, the upper and lower stage circuits of the shift register 56 shift one stage towards right. Specifically, the #1st stage latch circuit 67 and the #3rd stage latch circuits 67, 69 hold 1 in memory, while the latch circuit 65 holds 0 (merge signal) in memory.

If, at k=7, data $y_7$ is entered as –2.0, since $y_k-y_p<0$, the comparative logical circuit 55 judges that the condition is J7, that is, the branching is downward, and sets and outputs data β, merge signal and data α as –1, 1 and 1, respectively. The latch circuit 53*a* stores –1 as data β, while the latch circuit 53*b* stores data $y_7$ as data $y_p$ (p=7). At this time, the #(n+1)st stage selectors 66, 68 select the output A of the #nth stage latch circuit 67. That is, the candidate previously stored on the upper side circuit is deemed to be correct so that the contents of the upper side circuit of the shift register 56 are copied in the lower side circuit thereof. Specifically, the #2nd and #4th stage latch circuits 67, 69 hold 1 in memory, while the latch circuit 65 holds 1 (merge signal) as a candidate.

If, at k=8, data $y_8$ is entered as 2.0, since $+2 \leq y_k-y_p$, the comparative logical circuit 55 judges that the condition is J9, that is, the branching is upward, and sets and outputs data β, merge signal and data α as +1, 1 and 0, respectively. The latch circuit 53*a* stores +1 as data β, while the latch circuit 53*b* stores data $y_8$ as data $y_p$ (p=8). At this time, the #(n+1)st stage selectors 66, 68 select the output A of the #nth stage latch circuit 69. That is, the candidate previously stored on the upper side circuit is deemed to be not correct so that the contents of the lower side circuit of the shift register 56 are copied in the upper side circuit thereof. Specifically, the #3rd and #5th stage latch circuits 67, 69 hold 1 in memory, while the latch circuit 65 holds 1 (merge signal) as a candidate.

By appending a bit at the trailing end of bit string which necessarily generates one of the conditions J1, J3, J7 and J9, the contents of the upper and lower stages of the shift register are coincident with each other, so that decoded results can be obtained by outputting the contents of the upper or lower stages, for example, the upper stage, of the shift register.

The binary data Vn, produced by the above-mentioned viterbi decoding, is supplied to an arithmetic-logical circuit 70, as shown in FIG. 9. The arithmetic-logical circuit 70 performs the arithmetic-logical operations shown by the equation (13):

$$1/(1\%D) \qquad (13)$$

where % denotes exclusive OR, for converting the binary data Vn into the Grey code Gn.

The arithmetic-logical circuit 70 performs the arithmetic-logical operations shown in the equation (14):

$$1/(1\%D) \qquad (14)$$

on the Grey code Gn for regenerating the binary code Bn which is the original track address.

The specific operation of the servo circuit 14 when the track address is reproduced from the magnetic disk 1 so that the direction of magnetization represents the Grey code when the bit magnetized in the running direction of the magnetic head is "1" and the bit magnetized in the opposite direction is "0", is as shown in FIG. 3.

The state employed in the viterbi decoder 50 for PRS (1, –1) of the servo detection circuit 14 is the direction of magnetization and the Trellis diagram represents changes in magnetization.

It is now assumed that the pattern magnetized as shown in FIG. 3A is to be reproduced.

If the rightward magnetization an d the leftward magnetization as shown are 1 and 0, respectively, the address at the track (k+1) and that at the track k are 1100 and 1000, respectively, these addresses being recorded so that only one of the bits is different in accordance with the Grey code conditions.

Figure 3B:
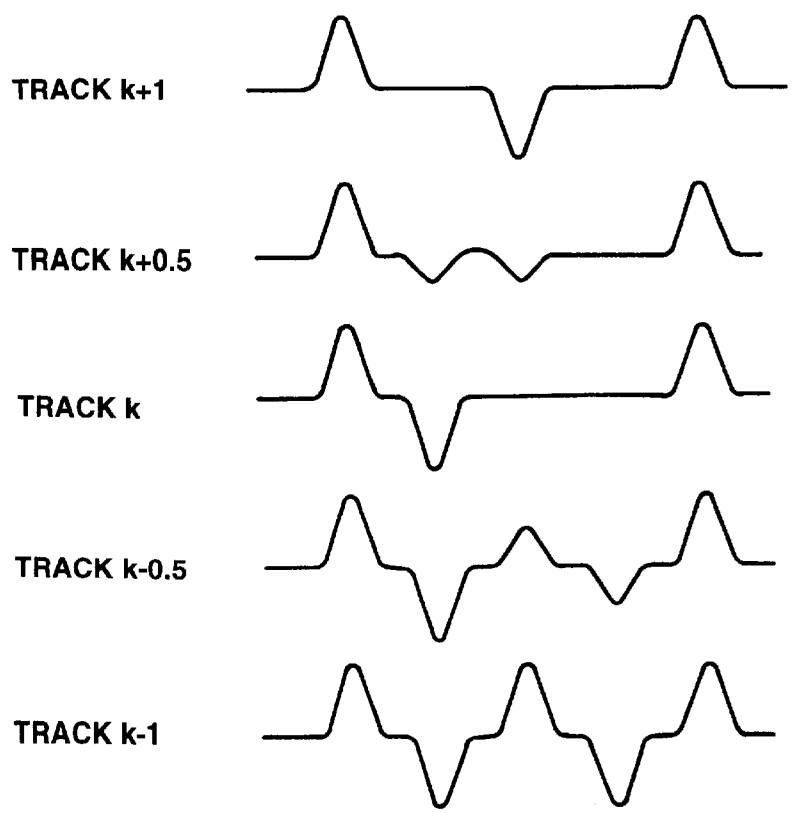

If the magnetic head t ravels the tracks k and (k+1), the playback signals shown in FIG. 3B are produced, depending on the traversed portion. Even though the noise is added to the playback signals, the paths that can be taken are eight paths shown in FIG. 14.

In this Trellis diagram, the values outputted by the viterbi decoder 50 (binary data Vn) is 10101 and 11001 for the four patterns shown in FIGS. 14A, 14B, 14C and 14D and for the four patterns shown in FIGS. 14E, 14F, 14G and 14H. If the arithmetic-logical operations shown in FIGS. 13 and 13E are performed on these values, these values turn out to be values 1100 and 1000 satisfying the Grey code. These values are the same as those obtained when the rightward magnetization and the leftward magnetization are set to 1 and 0, respectively, thus indicating that decoding has been done correctly.

If the viterbi decoder 50 shown in FIG. 9 is employed as the decoder for decoding the track address, as described above, all states in the Trellis diagram are not determined, terminal bits for determining these indefinite states are required.

Figure 15:
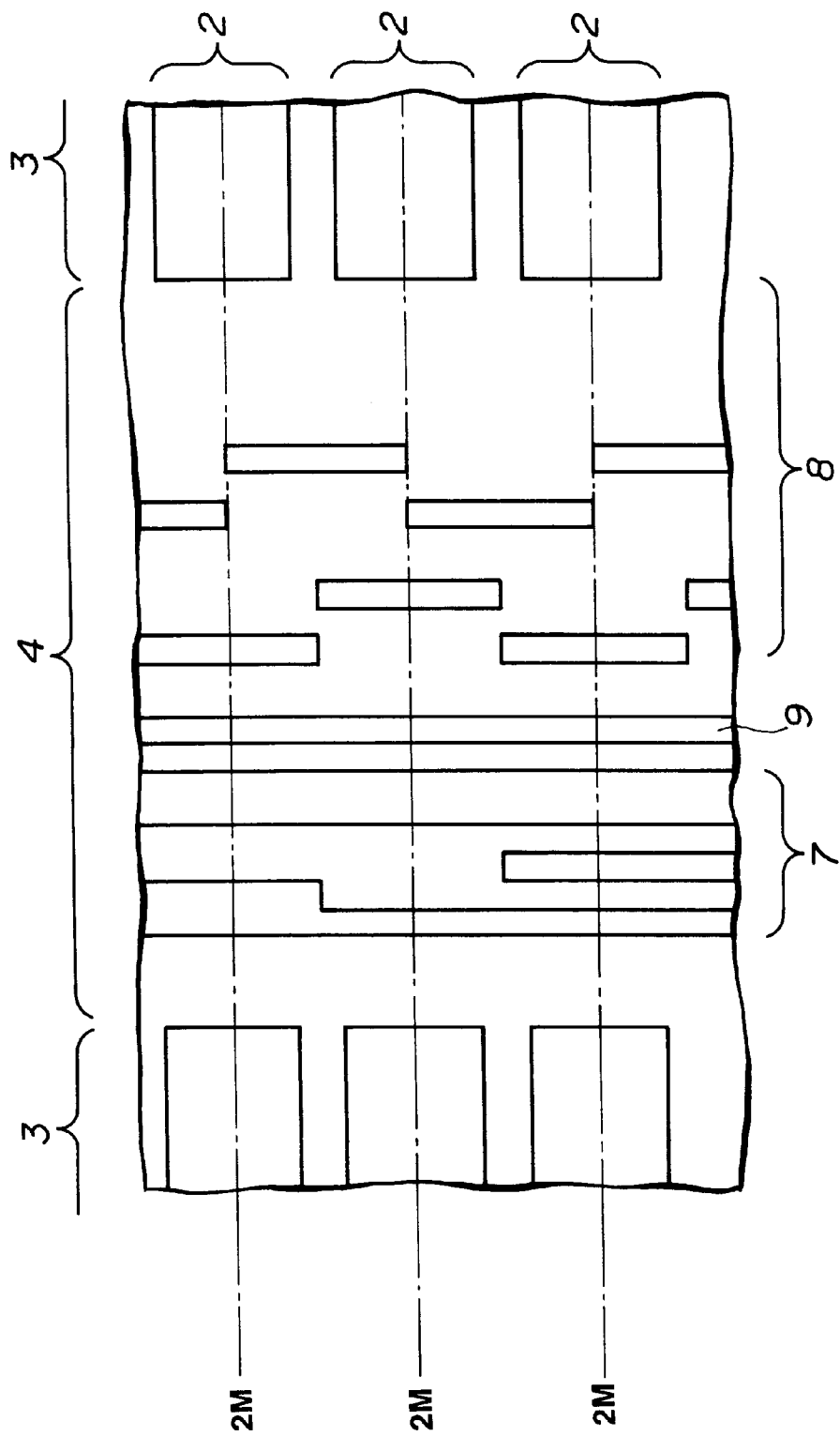
FIG. 15 is a plan view showing another servo pattern of the magnetic disk according to the present invention.

An illustrative format of a magnetic disk in which the terminal bit is used simultaneously as a clock mark signal in order to render it unnecessary to provide a new terminal bit is hereinafter explained with reference to FIG. 15.

The format of the magnetic disk is such that a clock mark 9 is recorded in a substantially radial direction with respect to the magnetic disk directly after the track address 7. The clock mark 9 is employed for generating clocks used for recording or reproducing data. That is, clocks are generated from reproduced signals of the clock marks and data is recorded or reproduced in accordance with these clocks. The portions which are the same as those of the magnetic disk shown in FIG. 3 are denoted by the same reference numerals and the corresponding description is omitted.

The viterbi decoder is configured for effecting decoding until the reproduced signal of the clock mark 9 is entered.

That is, at a time point when the last of the bits of the track address 7 enters the viterbi decoder, the values of all stages of the upper and lower side circuits of the shift register 56 shown in FIG. 11 are not coincident and hence are indefinite. However, the reproduced signals of the clock marks entering the viterbi decoder in succession are signals having the magnitude of +2 or −2 with respect to the viterbi decoder. Therefore, if the reproduced signals of the clock marks 9 enter the viterbi decoder, the result of condition judgment is necessarily divergent (merge signal=1), such that the values of all stages of the upper and lower stages of the shift register become coincident.

That is, it becomes possible to decode all signals recorded as the track addresses, such that it is unnecessary to provide new signals for terminating the Trellis diagram in viterbi decoding.

Second Embodiment

A second illustrative construction of the servo detection circuit for reproducing a track address by the above-described viterbi decoding is explained with reference to FIG. 16. The construction similar to that of the foregoing embodiment is not described further in detail.

Figure 16:
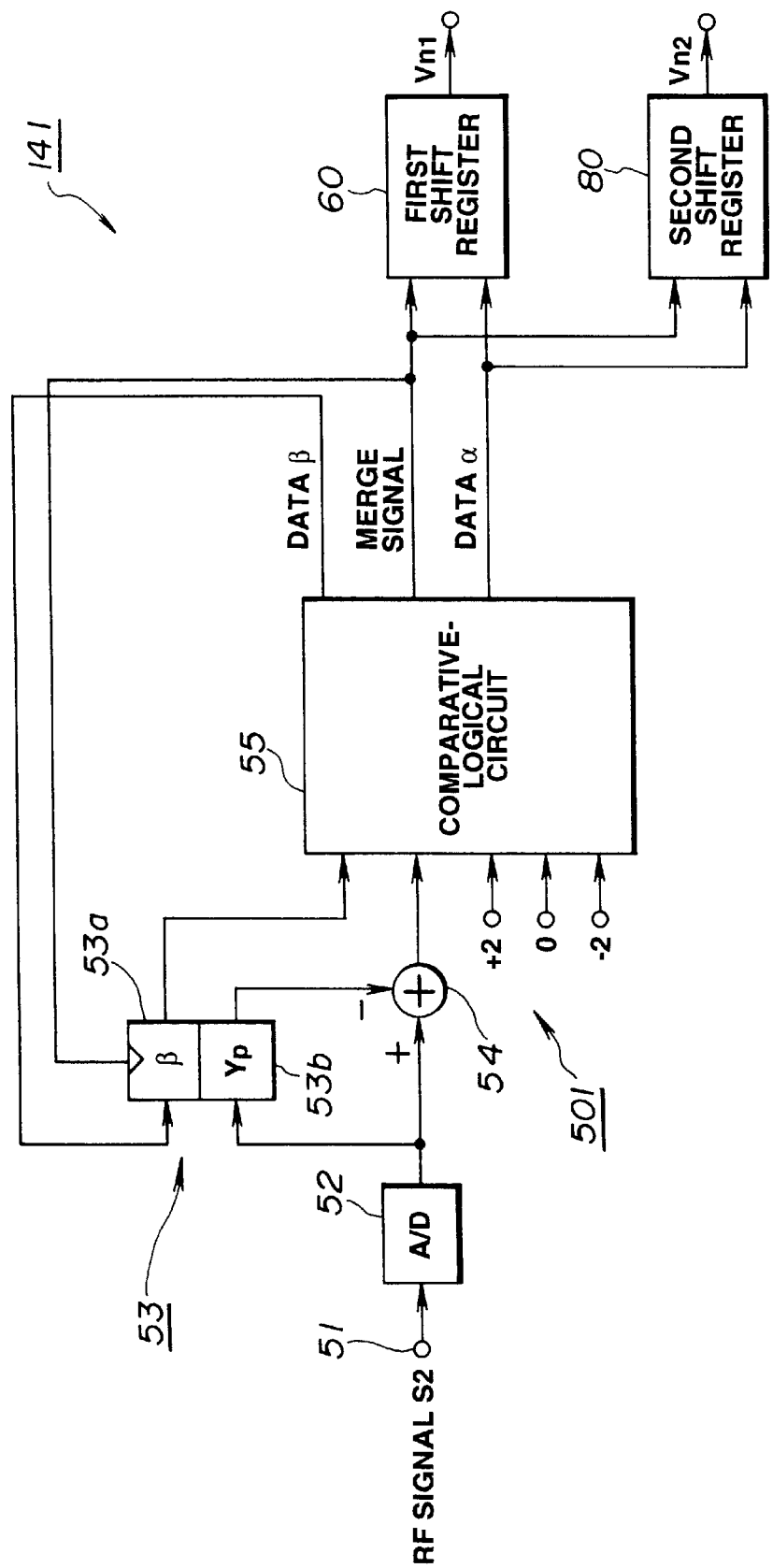
FIG. 16 is a block diagram showing a specific construction of the viterbi decoder constituting the magnetic disk apparatus.

A servo detection circuit 141 has a viterbi decoder 501, as shown for example in FIG. 16.

Like the embodiment shown in FIG. 9, the viterbi decoder 501 includes an A/D converter 52 for converting an RF signal S2 supplied from the signal processing circuit 13 into digital signals, and a latch circuit 53 for storing data $y_k$ from the A/D converter 52 as data $y_p$. The viterbi decoder also includes a subtractor 54 for subtracting data $y_p$ latched by the latch circuit 53 from the data $y_k$ from the A/D converter 52 and a comparative-logical circuit 55 for comparing the output of the subtractor 54 to a pre-set threshold value. However, the viterbi decoder also includes first and second shift registers 60, 80 for determining the path of the Trellis diagram in viterbi decoding.

The A/D converter 52 converts the portion of the RF signal S2 supplied via the terminal 51 from the signal processing circuit 13 into digital signals and transmits the resulting signal to the latch circuit 63 and the subtractor 54.

Figure 17:
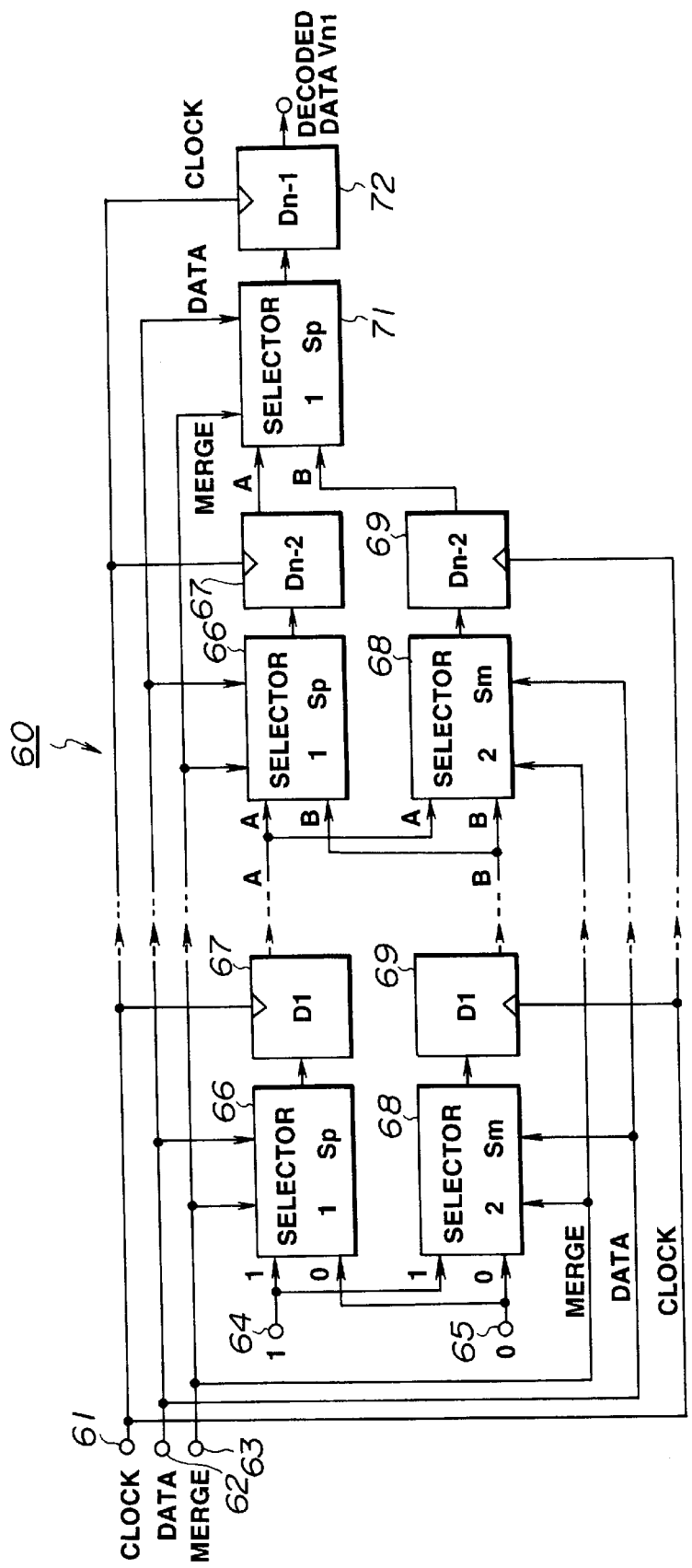
FIG. 17 is a circuit diagram showing a specific construction of a first shift register constituting the viterbi decoder.

The first shift register 60 has two parallel load/serial shift resisters, that is, two shift registers comprised of an upper side circuit made up of cascaded N selectors 66 and N latch circuits 67 and a lower side circuit made up of cascaded N selectors 68 and N latch circuits 69, as shown in FIG. 17.

The respective stages of the first shift register 60 are connected so that both outputs of the #nth stage latch circuits 67, 69 are fed to #(n+1)st stage selectors 66, 68, both outputs of the last stage latch circuits 67, 69 are supplied to the selector 71, an output of which is connected to the latch circuit 72, and data α and the merge signal are fed as selection signals from the comparator-logical circuit 55 via terminals 62, 63 to the selectors 66, 68 and 71. The #1st stage selectors 66, 68 are fed with 1 and 0 via terminals 64 and 65, respectively.

Figure 18:
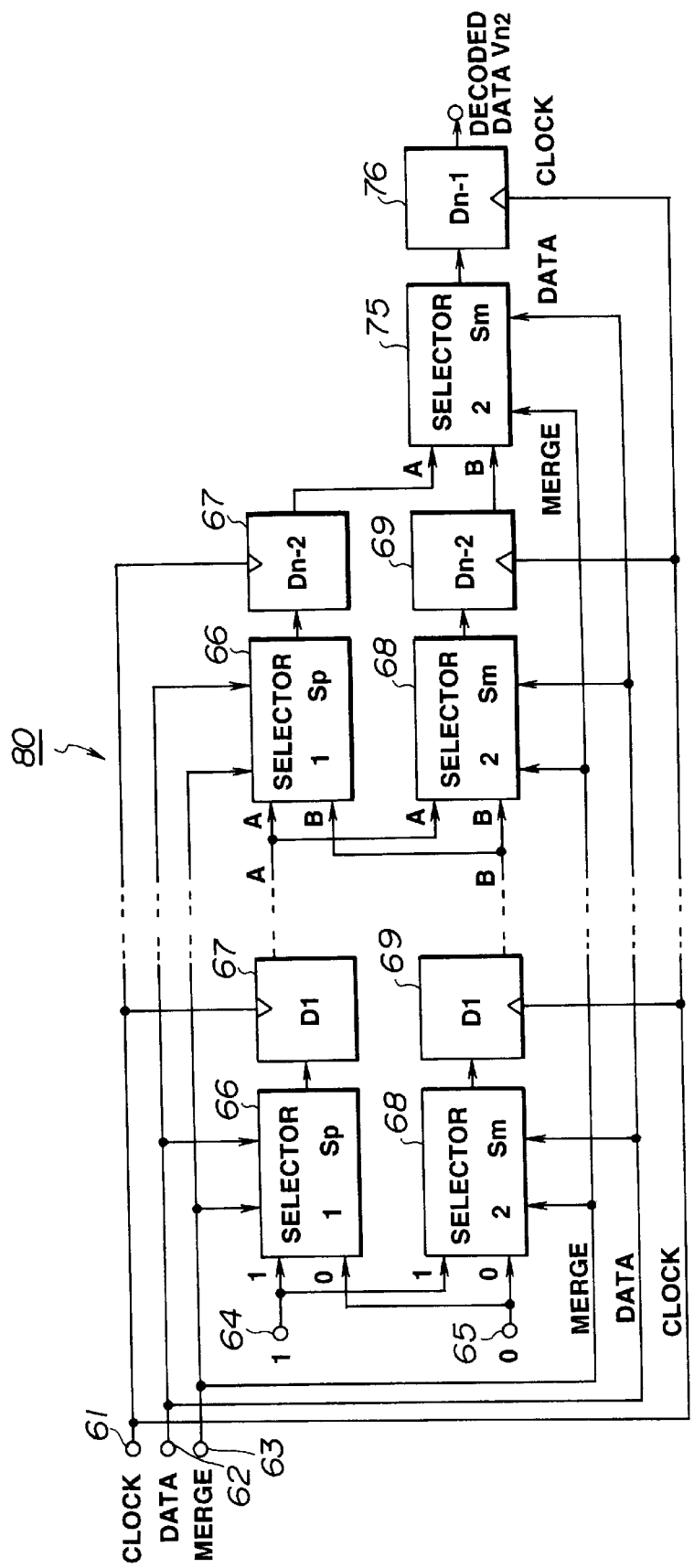
FIG. 18 is a circuit diagram showing a specific construction of a second shift register constituting the viterbi decoder.

The second shift register 80 has two parallel load/serial shift resisters, that is, two shift registers comprised of an upper side circuit made up of cascaded N selectors 66 and N latch circuits 67 and a lower side circuit made up of cascaded N selectors 68 and N latch circuits 69, as shown in FIG. 18.

The respective stages of the second shift register 60 are connected so that both outputs of the #nth stage latch circuits 67, 69 are fed to #(n+1)st stage selectors 66, 68, both outputs of the last stage latch circuits 67, 69 are supplied to a selector 75, an output of which is connected to the latch circuit 76, and data α and the merge signal are fed as selection signals from the comparator-logical circuit 55 via terminals 62, 63 to the selectors 66, 68 and 75. The #1st stage selectors 66, 68 are fed with 1 and 0 via terminals 64 and 65, respectively.

The latch circuits 67, 69 of the first and second shift registers 60, 80 are comprised of, for example, D-flipflops, and perform latch operations in synchronism with clocks supplied via terminal 61.

As for the first and second shift registers 60, 80, the #(n+1)st stage selector 66 selects and outputs an output A of the #nth stage latch circuit 67, while the #(n+1)st stage selector 68 selects and outputs an output B of the #nth stage latch circuit 69, as shown in FIG. 19. That is, parallel paths are formed, with the upper and lower stage signals being shifted to the upper and lower stage circuits, respectively. The selector 71 of the first shift register 60 selects and outputs the output A of the upper stage circuit, while the selector 75 of the second shift register 80 selects and outputs the output B of the lower stage circuit.

On the other hand, if the merge signal is 1 and data α is 1, the #(n+1)st stage selectors 66, 68 select and output the output A of the #nth stage latch circuit 67. That is, the upper state signals are shifted to both the upper and lower stage circuits. If the merge signal is 1 and data α is 0, the #(n+1)st stage selectors 66, 68 select and output an output B of the #nth stage latch circuit 69. That is, the lower state signals are shifted to both the upper and lower stages. In this manner, the contents of the upper or lower stage circuits are copied to the opposite side circuits, depending upon the value of data α, so that the #(n+1)st stage latch circuits 67, 69 become of the same value and the value of the latch circuit 67 is outputted from the selector 71 of the first shift register 60 while the value of the latch circuit 69 is outputted from the selector 75 of the second shift register 80.

Thus the latch circuit 72 of the first shift register 60 outputs playback data as binary data Vn1, while the latch circuit 75 of the second shift register 80 outputs playback data as binary data Vn2.

The operation of the viterbi decoder 501 fed via a terminal 51 with an RF signal S2 from the signal processing circuit 13 as shown in FIG. 14A is hereinafter explained. The initial values of the data $y_p$ and the data βat k=0 are −2 and −1, respectively, as shown in FIGS. 13D and 13E.

If an RF signal S2 as shown in FIG. 13A enters the viterbi decoder 50 at k=0, the A/D converter 52 enters data $y_0$ of 1.6 to the subtractor 54. More concisely, the data $y_0$ equal to 1.6 is entered at k=0.

Since $y_k - y_p > 2$, the comparator-logical circuit 55 judges that the condition is J9, that is that the branching is an upward branching as shown in FIG. 13B, so that it outputs data β, merge signal and the data α as +1, 1 and 1, respectively. The latch circuit 53a latches (stores) +1 as data β, as shown in FIG. 13D, while the latch circuit 53b latches (stores) +1 as data β, and data $y_0$ as data $y_p$ (p=0) as shown in FIG. 13E.

If, at k=1, data $y_1$ is entered as 0.2, since $2<y_k-y_p\leq0$, the comparator-logical circuit 55 judges that the condition is J2, that is, the path is parallel, and sets and outputs the merge signal and data α equal to 0. Thus the latch circuit 53a holds data β (+1) unchanged, while the latch circuit 53b holds the data $y_p$ ($y_0$) unchanged. At this time, the #(n+1)st stage selectors 66, 68 select outputs A, B of the #nth stage latch circuits 67, 69. That is, the shift register 60 shifts one stage towards the right. Specifically, the #1st stage latch circuits 67, 69 hold 1, 0, supplied via terminals 64, 65, in memory, respectively.

If, at k=2, data $y_2$ is entered as −0.2, since $-2<y_k-y_p\leq0$, the comparator-logical circuit 55 judges that the condition is J2, that is, the path is parallel, and outputs the merge signal equal to 0 and the data α as 0. Thus the latch circuit 53a holds data β (+1) unchanged, while the latch circuit 53b holds the data $y_p$ ($y_0$) unchanged. The #(n+1)st state selectors 66, 68 select outputs A, B of the #nth stage selectors 67, 69, respectively. That is, the shift register 60 shifts one stage towards right. Specifically, the #1st stage latch circuits 67, 69 hold 0 on memory, while the #2nd stage latch circuits 67, 69 hold 0 on memory and the #2nd stage latch circuits 67, 69 hold 1, 0 on memory, respectively.

If, at k=3, the data $y_3$ is entered as 2, since $y_k-y_p>0$, the comparator-logical circuit 55 judges that the condition is J3, that is, that the branching is upward branching. Thus the circuit sets and outputs the data β, merge signal and the data α as being equal to +1, 1 and 0, respectively. The latch circuit 53a holds +1 as data β, while the latch circuit 53b holds data $y_3$ as data $y_p$ (p=3). The #(n+1)st selectors 66, 68 select the output B of the #nth stage latch circuit 69. That is, the candidate previously stored in the upper side circuit is found to be not correct and the contents of the shift register 60 are copied in the upper stage. Specifically, all of the latch circuits of the #1st and #3rd stage latch circuits 67, 69 hold 0 in memory.

If, at k=4, the data $y_4$ is entered as 0.2, since $-2<y_k-y_p<0$, the comparator-logical circuit 55 judges that the condition is J2, that is, the path is parallel, and outputs the merge signal and data $\geq$ as 0. Thus the latch circuit 53a holds data β (+1) unchanged, while the latch circuit 53b holds the data $y_p$ ($y_3$) unchanged. The #(n+1)st stage selectors 66, 68 select outputs A, B of the #nth stage latch circuits 67, 69. That is, both the upper and lower side circuits of the shift register 60 shift one stage towards the right. Specifically, the #1st stage latch circuits 67, 69 hold 1, 0 in memory, while the latch circuits 67, 69 of the #2nd and #4th latch circuits 67, 69 hold 0 in memory. Only the latch circuits holding 1 in memory will now be explained.

If, at k=5, data $y_5$ is entered as −0.4, since $y_k\leq-2$, the comparator-logical circuit 55 judges that the condition is A, that is, the branching is downward. Thus it sets the data β and the merge signal to −1 and 1, respectively. The latch circuit 53a holds −1 as data β, while the latch circuit 53b holds data $y_5$ as data $y_p$ (p=5). The #(n+1)st stage selectors 66, 68 select outputs A of the #nth stage latch circuit 67. That is, since the candidate previously stored in the upper side circuit is correct, the contents of the upper state circuit of the shift register 56 are copied in the lower stage circuit. Specifically, the #2nd stage latch circuits 67, 69 hold 1 in memory.

If, at k=0, data $y_6$ is entered as −0.2, since $0\leq y_k-y_p<+2$, the comparator-logical circuit 55 judges that the condition is E, that is, the path is parallel, and outputs the merge signal and the data α as being equal to 0. Thus the latch circuit 53a holds data β (−1) unchanged, while holding the data $y_p$ ($y_5$) unchanged. The #(n+1)st stage selectors 66, 68 select outputs A, B of the #nth stage latch circuits 67, 69, respectively. That is, the upper and lower stage circuits of the shift register 56 shift one stage towards the right. Specifically, the #1st stage latch circuit 67 and the #3rd stage latch circuits 67, 69 hold 1 in memory, while the latch circuit 65 holds 0 (merge signal) in memory.

If, at k=7, data $y_7$ is entered as −2.0, since $y_k-y_p<0$, the comparative logical circuit 55 judges that the condition is D, that is, the branching is downward, and sets and outputs data β, merge signal and data α as −1, 1 and 1, respectively. The latch circuit 53a stores −1 as data β, while the latch circuit 53b stores data $y_7$ as data $y_p$ (p=7). At this time, the #(n+1)st stage selectors 66, 68 select the output A of the #nth stage latch circuit 67. That is, the candidate previously stored on the upper side circuit is deemed to be correct so that the contents of the upper side circuit of the shift register 56 are copied in the lower side circuit thereof. Specifically, the #2nd and #4th stage latch circuits 67, 69 hold 1 in memory.

If, at k=8, data $y_8$ is entered as 2.0, since $+2\leq y_k-y_p$, the comparative logical circuit 55 judges that the condition is F, that is, the branching is upward, and sets and outputs data β, merge signal and data α as +1, 1 and 0, respectively. The latch circuit 53a stores +1 as data β, while the latch circuit 53b stores data $y_8$ as data $y_p$ (p=8). At this time, the #(n+1)st stage selectors 66, 68 select the output A of the #nth stage latch circuit 69. That is, the candidate previously stored on the upper side circuit is deemed to be not correct so that the contents of the lower side circuit of the shift register 56 are copied in the upper side circuit thereof. Specifically, the #3rd and #5th stage latch circuits 67, 69 hold 1 in memory, while the latch circuit 65 holds 1 (merge signal) as a candidate.

The specific operation of the servo circuit 141 when the track address is reproduced from the magnetic disk 1 so that the direction of magnetization represents the Grey code when the bit magnetized in the running direction of the magnetic head is "1" and the bit magnetized in the opposite direction is "0", as shown in FIG. 3, is hereinafter explained.

The state employed in the viterbi decoder 501 for PRS (1, −1) of the servo detection circuit 141 is the direction of magnetization and the Trellis diagram represents changes in magnetization.

It is now assumed that the pattern magnetized as shown in FIG. 3A is to be reproduced.

If the rightward magnetization and the leftward magnetization as shown are 1 and 0, respectively, the address at the track (k+1) and that at the track k are 1100 and 1000, respectively, these addresses being recorded so that only one of the bits is different in accordance with the Grey code conditions.

If the magnetic head travels the tracks k and (k+1), the playback signals shown in FIG. 3B is produced, depending on the traversed portion. Even although the noise is added to the playback signals, the paths that can be taken are the eight paths shown in FIGS. 14A–14H.

In the Trellis diagram, the value outputted by the viterbi decoder 501 (binary data Vn) is 1000 and 1100 for four patterns of FIGS. 14A, 14B, 14C and 14D and for four patterns of FIGS. 14E, 14F, 14G and 14H. These values are the same as those when the rightward magnetization and leftward magnetization are set to 1 and 0, respectively, thus indicating that decoding has been done correctly.

If, with the gap area GE at the terminal end of the track register 60. However, at the shift register 80, the last bit can be definitely set to 1, with the addresses at the track (k+1) and at the track k being 0011 and 0111, respectively. These addresses are recorded in accordance with the Grey code conditions, that is so that the there is only one-bit difference between the two addresses.

Figure 20A:
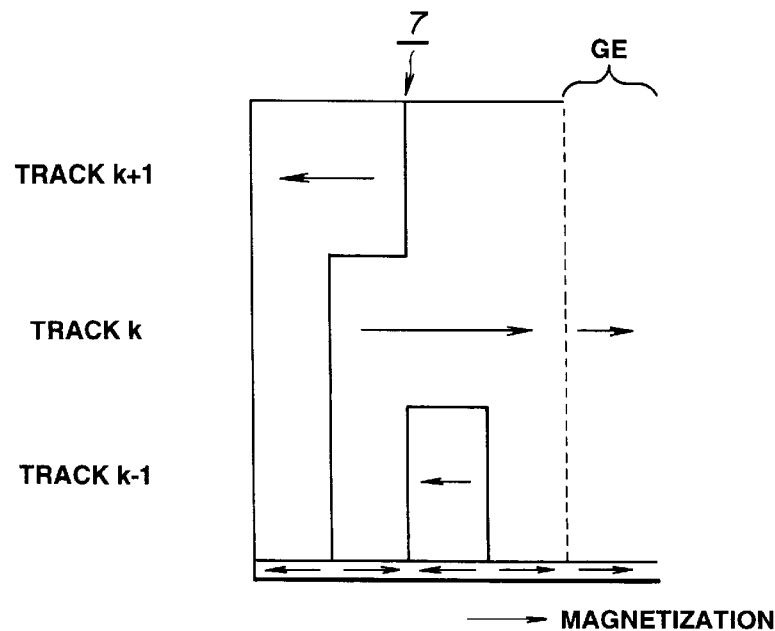
FIGS. 20A and 20B show an alternative pattern of magnetization of the Grey code according to the present invention and the corresponding playback signals, respectively.
Figure 20B:
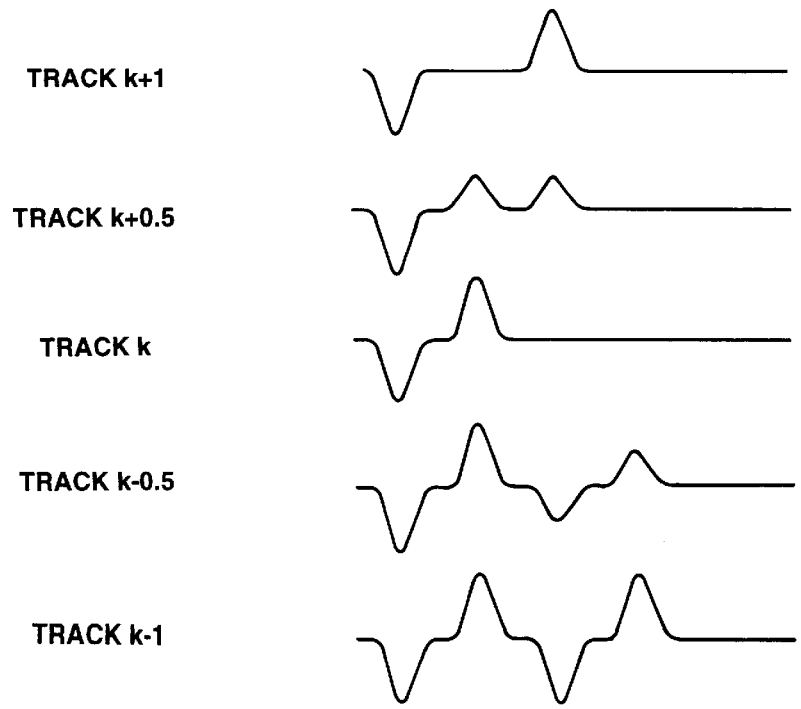

If the magnetic head travels the tracks k and (k+1), the playback signals shown in FIG. 20B are produced, depending on the traversed portion. Even although noise is added to the playback signals, the paths that can be taken are eight paths shown in FIGS. 12A–21H.

In the Trellis diagram, the values that can be outputted by the viterbi decoder 50 (binary data Vn) are 0011 and 0111 for the four patterns of FIGS. 21A, 21B, 21C and 21D and for the four patterns of FIGS. 21E, 21F, 21G and 21H, respectively. These are the same values when the rightward magnetization and the leftward magnetization of the magnetization patterns are set to 1 and 0, respectively, thus indicating that decoding has been done correctly.

Consequently, with the above-described viterbi decoder 501, if the direction of magnetization of the gap area GE is 1, the playback data Vn1 of the first shift register 60 is decoded correctly, whereas, if the direction of magnetization of the gap area GE is 0, the playback data Vn2 of the second shift register 80 is decoded correctly. Thus, based on the direction of address 7 shown in FIG. 3 has the rightward magnetization equal to 1, the last bit of the track 3 has the leftward magnetization equal to 0, there is the transition of magnetization at a boundary between the last bit and the gap area GE. The first shift register 60 of the viterbi decoder 50 determines the path of the last bit using the playback signal of the transition of magnetization.

On the other hand, if the last bit of the track address 7 has the same rightward magnetization as that of the gap area GE equal to 1, as shown in FIG. 20, there is no transition of magnetization at the boundary between the last bit and the gap area GE such that the path is a parallel path, with the merge signal being 0. The path of the last bit cannot be determined by the shift register 60. However, the path of the last bit is determined by the shift register 80 with the last bit in the selector 75 being 0 and with the merge signal being 1.

As an illustrative example, the case of reproducing a pattern in which the last bit of the track address 7 is magnetized to the same rightward magnetization as that of the gap area GE equal to 1 as shown in FIG. 20A is explained.

If, in such case, the rightward magnetization and the leftward magnetization are 1 and 0, respectively, there is no transition of magnetization at a boundary between the last bit and the gap area GE, with the paths being parallel paths, such that the path of the last bit cannot be determined in the shift magnetization of the gap area GE, playback data of the first shift register 60 or the second shift register 80 are outputted as correct decoded signals.

The present invention is not limited to the above-described embodiment. For example, although the above-described embodiment is directed to recording the track addresses so that the directions of magnetization corresponding to the track addresses represent the Grey code between adjacent tracks, the track addresses may also be recorded on the magnetic disk so that the magnetization or non-magnetization corresponding to the track addresses represent the Grey code between the neighboring tracks, so that reproduced signals will be viterbi-decoded. The reproduced signals of the track addresses are the same as those shown in FIGS. 3B and 20B, so that the same effect as that described above may be derived.

In the above-described embodiment, the viterbi decoder 501 has the first shift register 60 and the second shift register 80 in order to provide a construction capable of coping with optional directions of magnetization of the gap area GE. However, the present invention is not limited to such construction of the viterbi decoder 501. For example, if, by the design statements for the magnetic disk, the direction of magnetization of the gap area GE at the terminal end of the track address 7 is set to 1, there is no necessity of providing the second shift register 80, whereas, if the direction of magnetization of the gap area GE is set to 1, there is no necessity of providing the first shift register 60. The present invention is applicable to any of these cases.

According to the present invention, as described above, the address information for specifying data-recording tracks is recorded on the magnetic recording medium so that the direction of magnetization or magnetization or non-magnetization corresponding to the address information represents the Grey code between neighboring tracks and the reproduced signals of the address information is maximum likelihood decoded for reproducing the address information. In this manner, the address information may be more reliably decoded without adding redundancy to the number of bits of the volume of information required as the address information while the properties as the Grey code are maintained.

That is, the region for recording the address information may be diminished as compared to that of, for example, a conventional magnetic disk, thereby enabling the recording capacity of the magnetic disk to be increased. In addition, since the region required for the address information is decreased, the magnetic head may be moved with a higher velocity for diminishing the seek time.

Furthermore, if the clock mark is used as a terminal bit for viterbi decoding, it is unnecessary to add a redundant signal for determining the inner state of the viterbi decoder for enabling the recording capacity to be increased correspondingly.

In addition, the reproduced signals of the address information and the terminal information are maximum likelihood decoded for reproducing the address information and the terminal information corresponding to the direction of magnetization or the magnetization/non-magnetization is reproduced whereby the address information may be decoded more accurately without adding redundancy to the number of bits of the amount of information required as the address information while the properties of the Grey code are maintained.

Also, since the terminal bit for definitely setting the inner state of the viterbi decoder may be eliminated, the recording capacity may be increased further.

What is claimed is:

1. A magnetic disk having plural tracks for recording data concentrically or spirally formed on a recording surface thereof, wherein address information for specifying the tracks is recorded on the corresponding tracks as a direction of magnetization in a circumferential direction of the disk, so that a first polarity in a first circumferential direction of the disk represents a one, and an opposite polarity in an opposite circumferential direction of the disk represents a zero, of the address information corresponding to a Grey code between neighboring tracks, and wherein terminal information magnetized in a predetermined direction is recorded in a terminal region of the address information.

2. The magnetic disk as claimed in claim 1, wherein the terminal information is information used to terminate a codestring in viterbi decoding the address information.

3. The magnetic disk as claimed in claim 1, wherein the address information is composed of a raised region magnetized in one direction and a recessed region magnetized in the other direction.

4. The magnetic disk as claimed in claim 1, wherein the terminal region of the address information is a gap area.

5. The magnetic disk as claimed in claim 1, wherein the terminal information is a clock mark for generating a clock used for recording or reproducing data, the clock mark being magnetized in a predetermined direction and recorded substantially radially.

6. The magnetic disk as claimed in claim 5, wherein the address information is composed of a raised region magnetized in a predetermined direction and a non-magnetized recessed region.

7. The magnetic disk as claimed in claim 5, wherein the terminal region of the address information is a gap area.

8. A magnetic disk having plural tracks for recording data concentrically or spirally formed on a recording surface thereof,
wherein address information for specifying the tracks is recorded on the corresponding tracks as a code of magnetized and non-magnetized portions representing a Grey code between neighboring tracks, and wherein terminal information is recorded in a terminal region of the address information in accordance with the code of magnetized and non-magnetized portions.

9. The magnetic disk as claimed in claim 8, wherein a clock mark for generating a clock used for recording or reproducing data is recorded substantially radially, the terminal information being formed by magnetizing the clock mark in a predetermined direction.

10. The magnetic disk as claimed in claim 6, wherein the terminal information is information used to terminate a codestring in viterbi decoding the address information.

11. A data reproducing apparatus for reproducing data from a magnetic disk in which plural tracks having the data recorded thereon are concentrically or spirally formed on a recording surface thereof, and address information for specifying the tracks is recorded on the corresponding tracks by changing a direction of magnetization in a circumferential direction of the disk, so that a first polarity in a first circumferential direction of the disk represents a one, and an opposite polarity in an opposite circumferential direction of the disk represents a zero, of the address information corresponding to a Grey code between neighboring tracks, the apparatus comprising:
a magnetic head for being moved in a direction traversing the tracks to reproduce data on the tracks; and
maximum likelihood decoding means for maximum likelihood decoding reproduced signals from the magnetic head;
wherein the maximum likelihood decoding means includes a viterbi decoder for determining a value of data by calculating a differential metric at a predetermined time point in response to a change in the direction of magnetization of the magnetic disk, and wherein terminal information magnetized in a predetermined direction is recorded in a terminal region of the address information on the magnetic disk, and wherein the viterbi decoder determines decoded data by terminating a codestring using a reproduced signal of the terminal information.

12. The data reproducing apparatus as claimed in claim 11, further comprising means for converting output data from the viterbi decoder into the Grey code, and means for calculating binary data as the address information from the Grey code.

13. The data reproducing apparatus as claimed in claim 11, wherein a clock mark for generating a clock used for recording or reproducing data is recorded substantially radially on the magnetic disk, and wherein the viterbi decoder decodes data entered thereto on the basis of a reproduced signal from the clock mark by the time when the reproduced signal is entered.

14. The data reproducing apparatus as claimed in claim 11, wherein the viterbi decoder has a path memory having plural shift registers for independently shifting in response to a synchronization signal entered thereto, and selects output data from the plural shift registers so that a path is determined by determining the final bit in the address information.

15. The data reproducing apparatus as claimed in claim 14, wherein a gap area magnetized in a predetermined direction is formed at a terminal end in a region in which the address information is recorded on the magnetic disk, and wherein the viterbi decoder outputs one of the output data from the plural shift registers as a decoding signal on the basis of the direction of magnetization of the gap area.

16. A data reproducing apparatus for reproducing data from a magnetic disk in which plural tracks having the data recorded thereon are concentrically or spirally formed on a recording surface thereof, and address information for specifying the tracks is recorded on the corresponding tracks in accordance with a coded pattern of magnetized and non-magnetized portions representing the address information being recorded so as to correspond to a Grey code between neighboring tracks, the apparatus comprising:
a magnetic head for being moved in a direction traversing the tracks to reproduce data on the tracks; and
maximum likelihood decoding mean for reproducing the address information by maximum likelihood decoding reproduced signals from the magnetic head;
wherein the maximum likelihood decoding means includes viterbi decoding means for determining a value of data by calculating a differential metric at a predetermined time point in response to a change of the magnetized state of the magnetic disk, and wherein terminal information in a predetermined magnetized state is recorded in a terminal region of the address information on the magnetic disk, and wherein the viterbi decoder determines decoded data by terminating a codestring using a reproduced signal of the terminal information.

17. The data reproducing apparatus as claimed in claim 16, further comprising means for converting output data from the viterbi decoder into the Grey code, and means for calculating binary data as the address information from the Grey code.

18. The data reproducing apparatus as claimed in claim 16, wherein a clock mark for generating a clock used for recording or reproducing data is recorded substantially radially on the magnetic disk, and wherein the viterbi decoder decodes data entered thereto on the basis of a reproduced signal from the clock mark by the time when the reproduced signal is entered.

19. The data reproducing apparatus as claimed in claim 16, wherein the viterbi decoder has a path memory having plural shift registers for independently shifting in response to a synchronization signal entered thereto, and selects output data from the plural shift registers so that a path is determined by determining the final bit in the address information.

20. The data reproducing apparatus as claimed in claim 19, wherein a gap area magnetized in a predetermined direction is formed at a terminal end in a region in which the address information is recorded on the magnetic disk, and wherein the viterbi decoder outputs one of the output data from the plural shift registers as a decoding signal on the basis of the magnetized state of the gap area.

* * * * *

UNITED STATES PATENT AND TRADEMARK OFFICE
CERTIFICATE OF CORRECTION

PATENT NO.     : 6,424,479 B1                                              Page 1 of 1
DATED          : July 23, 2002
INVENTOR(S)    : Nobuhiro Hayashi It is certified that error appears in the above-identified patent and that said Letters Patent is hereby corrected as shown below:

<u>Title page,</u>
Item [*], Notice, delete "0" and insert -- 1117 --.

Signed and Sealed this

Twenty-fourth Day of June, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,424,479 B1
DATED : July 23, 2002
INVENTOR(S) : Nobuhiro Hayashi

It is certified that error appears in the above-identified patent and that said Letters Patent is hereby corrected as shown below:

Column 2,
Line 6, change "As the" to -- A --
Line 15, change "code etc" to -- code, etc. --
Line 59, change "a da" to -- a responding --

Column 3,
Line 17, change "whole the properties as" to -- ,while the properties of --
Line 64, change "19 is" to -- 19 --

Column 4,
Line 20, change "4" to -- $\phi$ --
Line 27, change "ID field etc" to -- ID field, etc. --

Column 5,
Line 43, change "addresses etc" to -- addresses, etc. --

Column 6,
Line 7, change "decoder etc." to -- decoder, etc. --
Line 29, change "data etc." to -- data, etc. --
Line 43, change "PWN" to -- PWM --
Line 60, change "15," to -- is --

Column 7,
Line 40, change "$L_k^{31}$" to -- $L_{k-1}^-$ --

Column 8,
Line 10, change "i" to -- in --

Column 9,
Line 16, change "t o" to -- to --
Line 19, change "he" to -- the --

Column 10,
Line 33, change "$y_k y_p$" to -- $y_k - y_p$ --
Lines 51, 53 and 65, change "on" to -- in --

Column 11,
Line 6, change "$Y_3$" to -- $y_3$ --
Line 26, change "on" to -- in --

UNITED STATES PATENT AND TRADEMARK OFFICE
CERTIFICATE OF CORRECTION

PATENT NO. : 6,424,479 B1
DATED : July 23, 2002
INVENTOR(S) : Nobuhiro Hayashi

It is certified that error appears in the above-identified patent and that said Letters Patent is hereby corrected as shown below:

Column 12,
Line 46, change "an d" to -- and --
Line 52, change "t ravels" to -- travels --
Line 61, change "13" to -- 13D --

Column 14,
Line 59, change "14A" to -- 13A --
Line 60, change "βat" to -- β at --

Column 17,
Line 2, insert -- address 7 shown in Fig. 3 has the rightward magnetization equal to 1, the last bit of the track 3 has the leftward magnetization equal to 0, there is the transition of magnetization at a boundary between the last bit and the gap area GE. The first shift register 60 of the viterbi decoder 50 determines the path of the last bit using the playback signal of the transition of magnetization.
 On the other hand, if the last bit of the track address 7 has the same rightward magnetization as that of the gap area GE equal to 1, as shown in Fig. 20, there is no transition of magnetization at the boundary between the last bit and the gap area GE such that the path is a parallel path, with the merge signal being 0. The path of the last bit cannot be determined by the shift register 60. However, the path of the last bit is determined by the shift register 80 with the last bit in the selector 75 being 0 and with the merge signal being 1.
  As an illustrative example, the case of reproducing a pattern in which the last bit of the track address 7 is magnetized to the same rightward magnetization as that of the gap area GE equal to 1 as shown in Fig. 20A is explained.
  If, in such case, the rightward magnetization and the leftward magnetization are 1 and 0, respectively, there is no transition of magnetization at a boundary between the last bit and the gap area GE, with the paths being parallel paths, such that the path of the last bit cannot be determined in the shift --
Line 6, delete "the"
Line 12, change "12A" to -- 21A --
Delete lines 27-54, beginning with "address" and ending with "shift"

UNITED STATES PATENT AND TRADEMARK OFFICE
CERTIFICATE OF CORRECTION

PATENT NO. : 6,424,479 B1
DATED : July 23, 2002
INVENTOR(S) : Nobuhiro Hayashi

It is certified that error appears in the above-identified patent and that said Letters Patent is hereby corrected as shown below:

<u>Column 18,</u>
Line 19, change "or magnetization" to -- or the state of magnetization --
Line 48, change "information while" to -- information, while --

<u>Column 19,</u>
Line 34, change "6" to -- 8 --

Signed and Sealed this

Nineteenth Day of August, 2003

JAMES E. ROGAN
*Director of the United States Patent and Trademark Office*